United States Patent [19]

Cates et al.

[11] Patent Number: 5,782,253

[45] Date of Patent: Jul. 21, 1998

[54] SYSTEM FOR REMOVING A COATING FROM A SUBSTRATE

[75] Inventors: Michael C. Cates, Solano Beach; Richard R. Hamm; John D. Hoogerwerf, both of San Diego, all of Calif.; Michael W. Lewis, Wichita, Kans.; Wayne N. Schmitz, St. Louis, Mo.

[73] Assignees: McDonnell Douglas Corporation, St. Louis, Mo.; Maxwell Laboratories, Inc., San Diego, Calif.

[21] Appl. No.: 204,852

[22] Filed: Mar. 2, 1994

Related U.S. Application Data

[63] Continuation-in-part of Ser. No. 813,872, Dec. 24, 1991, Pat. No. 5,328,517.

[51] Int. Cl.$^6$ .................................................... B08B 3/10
[52] U.S. Cl. ........................... 134/105; 134/201; 134/7
[58] Field of Search ............................ 134/56 R, 57 R, 134/58 R, 201, 1, 7, 19, 105; 15/302, 320; 250/205

[56] References Cited

U.S. PATENT DOCUMENTS

| | | | |
|---|---|---|---|
| 3,700,850 | 10/1972 | Lumley et al. | 219/121 |
| 3,986,391 | 10/1976 | Vahaviolos | 73/88 |
| 4,249,956 | 2/1981 | Hartman | 134/7 |
| 4,398,961 | 8/1983 | Mason | 134/19 |
| 4,419,562 | 12/1983 | Jon et al. | 219/130 |
| 4,491,484 | 1/1985 | Williams | 134/4 |
| 4,504,727 | 3/1985 | Melcher et al. | 219/121 |
| 4,543,486 | 9/1985 | Rose | 250/492 |
| 4,582,540 | 4/1986 | Allback | 134/1 |
| 4,588,885 | 5/1986 | Lovoi et al. | 250/226 |
| 4,631,250 | 12/1986 | Hayashi | 134/7 |
| 4,655,847 | 4/1987 | Ichinoseki | 134/7 |
| 4,682,594 | 7/1987 | Mok | 128/303 |
| 4,693,756 | 9/1987 | Schlick | 134/7 |
| 4,718,974 | 1/1988 | Minaee | 156/643 |
| 4,731,125 | 3/1988 | Carr | 134/17 |
| 4,737,628 | 4/1988 | Lovoi | 250/226 |
| 4,756,765 | 7/1988 | Woodroffe | 134/1 |
| 4,803,021 | 2/1989 | Werth et al. | 264/25 |
| 4,806,171 | 2/1989 | Whitlock et al. | 134/7 |
| 4,836,858 | 6/1989 | Reinhart | 134/1 |
| 4,867,796 | 9/1989 | Asmus et al. | 131/1 |
| 4,994,639 | 2/1991 | Dickinson et al. | 219/121 |
| 5,013,366 | 5/1991 | Jackson et al. | 134/1 |
| 5,024,968 | 6/1991 | Englesberg | 437/173 |
| 5,035,750 | 7/1991 | Tada et al. | 134/7 |

(List continued on next page.)

FOREIGN PATENT DOCUMENTS 1-271090  10/1989  Japan .................. 219/121.86

OTHER PUBLICATIONS

IBM Tech. Disc. Bull., vol. 24, No. 9 Feb. 1982.
Appl. Phys., Dec. 1982, pp. 1043–1044.
Schmitz, Xenon Flashlamp . . . , 6 pp., Apr. 30–May 2, 1991.
Michael C. Cates, Modeling of the Flashblast . . . , 13 pp.

*Primary Examiner*—Frankie L. Stinson
*Attorney, Agent, or Firm*—Bell Seltzer Intellectual Property Law Group; Alston & Bird LLP

[57] ABSTRACT

A system is provided for removing material from a structure having at least one layer of the material formed on a substrate. The system includes a radiant energy source, such as a flashlamp, with an actively cooled reflector for irradiating a target area of a structure with radiant energy, preferably sufficiently intense in at least the visible and ultraviolet, to break or weaken chemical bonds in the material, and an abrasive blaster for impinging the material after irradiation with a cool particle stream, preferably including of $CO_2$ particles, to remove the irradiated material and cool the substrate. The system may also include light sensors used in a feedback loop to control the removal process by varying the speed at which the radiant energy source is moved along the structure, the repetition rate of the source, the intensity of the source, the pulse width of the source and/or the distance between the source and the structure.

51 Claims, 13 Drawing Sheets

U.S. PATENT DOCUMENTS

| | | | |
|---|---|---|---|
| 5,062,898 | 11/1991 | McDermott et al. | 134/7 |
| 5,065,630 | 11/1991 | Hadcock et al. | 73/802 |
| 5,194,723 | 3/1993 | Cates et al. | |
| 5,204,517 | 4/1993 | Cates et al. | |
| 5,217,925 | 6/1993 | Ogawa et al | 134/7 |
| 5,225,000 | 7/1993 | Fujii et al. | 134/71 |
| 5,281,798 | 1/1994 | Hamm et al. | |
| 5,571,335 | 11/1996 | Lloyd | 134/1 |

SYSTEM FOR REMOVING A COATING FROM A SUBSTRATE

This is a continuation-in-part of application Ser. No. 07/813.872 filed on 24 Dec. 1991 now U.S. Pat. No. 5.328.517.

The present invention relates to a system for removing a coating from a substrate, and more particularly to a material removal system that uses pulsed light to damage the chemical bonds of a coating on a substrate and a particle stream to impinge and remove the damaged coating.

BACKGROUND OF THE INVENTION

Coatings play an important role in today's manufactured products based society. Coatings provide immunity to corrosion, thermal insulation, shielding, enhanced appearance, as well as aid in identification. Paints and other types of protective coatings are purposely designed to adhere to the substrate to which they are applied and resist removal. Thus, the removal of paints and other coatings from a substrate is usually very difficult.

During the life of many manufactured products, such as bridges, aircraft, automobiles, and ships, coatings must be removed and replaced for a variety of reasons. For example, refurbishment of the paint on aircraft is a regular maintenance item. Commercial airlines typically repaint their aircraft about every four to five years of service. Coatings on the exterior surfaces of large ships or bridges require periodic refurbishment in order to prevent or inhibit corrosion.

The removal of paint from the surfaces of aircraft presents special problems. Such surfaces are large, irregularly shaped, and relatively delicate. Because the surfaces of aircraft are typically relatively soft aluminum, aluminum alloys, or organic-based composite materials, such surfaces and the underlying substrates are particularly susceptible to damage while undergoing paint removal, which could degrade their structural integrity.

Many different methods have been used to remove painted coatings. One method, the particle medium blast (PMB) method involves impinging the surface to be stripped with particles such as Bb's, plastic media, steel shot, wheat starch, sand, even liquids such as water and frozen particles such as frozen $CO_2$ particles and solidified argon particles (See HAYASHI, U.S. Pat. No. 4,631,250; ICHINOSEKI, U.S. Pat. No. 4,655,847; and McDERMOTT, U.S. Pat. No. 5,062,898). However, PMB methods sufficiently energetic to remove hardened coatings, such as paint, by themselves may damage delicate surfaces such as found on aircraft and automobiles if they are not carefully managed. For example, if the nozzle supplying the impinging particles dwells too long at one location, the impinged surface may become pitted or stress hardened. This is especially important to avoid with regard to the surfaces of aircraft since pitting or stress hardening may change the mechanical properties of the surface material. High-energy PMB methods may also deform the surface of the substrate sufficiently to mask fatigue cracks and other anomalies that, if undetected and uncorrected, could lead to catastrophic failure of the substrate. PMB may also damage putty joints often found on aircraft between surface plates. Moreover, most PMB processes generate a large amount of particulate waste requiring costly disposal, since this waste is often contaminated by toxic constituents of the coating.

Another method involves the application of chemical agents to painted surfaces in order to chemically break down the layers of paint, thereby stripping the paint away from the surface to be exposed. However, such agents may pose a risk to human health, are usually toxic, and are often not biodegradable. Overall, these types of agents are difficult and costly to dispose of because they present serious environmental problems. Government regulations are increasingly restrictive of the use of such agents.

Still other methods involve the mechanical removal of the coating from the substrate. For example, U.S. Pat. No. 4,836,858, entitled, "Ultrasonic Assisted Paint Removal Method" discloses a hand-held tool, which uses an ultrasonic reciprocating edge placed in contact with the surface to be stripped. Use of such tools is labor intensive and requires skilled operators. Further, control of this tool is a problem when applied to aircraft because the aircraft surface may be damaged if there is excessive tool dwell at one location.

Still other methods involve the application of radiant energy to the coating. One such system uses a flashlamp pumped laser and video frame grabber in a video controlled paint removal system in which paint is stripped from a surface using the output of the laser to ablate the paint while a video camera converts images of the surface being stripped into electronic data signals. The data signals are used to control the laser output. A processor compares the data signals with parameters stored in a memory to determine whether sufficient paint has been removed from the surface being stripped. If an insufficient amount of paint has been removed, then the laser continues to irradiate the surface. If the surface has been adequately stripped, the processor directs the laser to ablate another area. A significant problem with the video controlled paint removal system is that the amount of data, which is generated and which must be processed is enormous, making real time control extremely difficult.

Furthermore, a laser powerful enough to vaporize paint requires high power due, in part, to laser pumping inefficiencies. Employment of such a powerful laser requires a large capital investment in order to provide space to operate the laser, as well as laser stops to prevent the laser beam from inadvertently escaping the work area and even the building where it is being used. Such a laser poses a serious danger to humans, who must be kept out of the area when the laser operates. Another problem with the use of lasers is the occurrence of localized hot spots that can damage or destroy the substrate.

Pulsed light, for example from flashlamps, has also been used to ablate coatings from their substrates. A problem with ablating solely with radiant energy is the risk of heat damage to the substrate. Moreover, ablation can result in flame and smoke, which can reduce the efficiency of or damage the equipment, and which may pose a hazard for personnel. Further, these processes typically leave a non-water soluble carbonized residue that must be removed in a labor-intensive process. The baking or pyrolyzing of the coating has been followed by a PMB process such as shown by SCHLICK in U.S. Pat. No. 4,693,756, but although more effective than ablation alone, heat damage still occurs to the substrate as does impact damage.

The use of composite structures manufactured, for example, of graphite epoxy or other reinforced plastic materials is becoming increasingly common. Many aircraft and automobiles extensively employ reinforced composite materials, including graphite epoxy materials, for surface structures. Such structures are painted for a variety of reasons including aesthetics, identification, and camouflage. However, such painted surfaces deteriorate under the action of weather and the mechanical forces to which they are subjected, thus requiring removal and replacement.

Other than hand sanding, there have been no suitable methods or apparatus for removing paint from non-metallic composite surfaces. PMB and mechanical grinding methods sufficiently energetic to remove paint by themselves have been proven to damage composite materials. The removal of paint with chemical agents does not offer a satisfactory solution because such chemicals tend to attack the organic binder in the composites, as well as the paint. Some composites are sensitive to high temperatures, such that prior high temperature methods of removing coatings are not satisfactory.

For a variety of reasons, paint removal techniques and devices for removing paint from large surfaces, and surfaces having topological anomalies such as rivets, have not proven wholly satisfactory. Thus, it can be appreciated that coating removal, and particularly, the removal of paint from large and often delicate surfaces such as found on aircraft and automobiles, is a problem that has not heretofore been satisfactorily solved.

SUMMARY OF THE INVENTION

This invention provides a system for removing material, such as paint, radar absorbing material (RAM) and other coatings, adhesives and excess resin from a structure. Generally, the system includes a controllable source of intense visible and ultraviolet radiation and a reflecting housing thereabout to cool the source and to direct the radiation at a selected surface area of the material with enough intensity to damage the chemical bonds within the material and to weaken its adhesion to the substrate. A nozzle is positioned adjacent the housing for impinging particles and coolant on the damaged material to remove it from its weakened grip on the substrate. The coolant is used to assure the substrate is not heat damaged, to shock the material thermally for easy removal and to help cool the housing.

In one embodiment of the invention the housing has a window, a flashlamp mounted in the housing behind the window for irradiating the target area on the structure with the radiant energy, and a nozzle mounted to the exterior of the housing for directing the stream of particles and coolant generally at the target area.

In another embodiment of the invention, a photodetecting system is included, which detects the optical character of the surface of the structure. Feedback generated by the photodetecting system is analyzed by a digital data processor, which generates output signals that control the scan speed, repetition rate, peak output, or pulse width of the radiant energy source, and the particle stream and optionally the coolant flow over the structure.

In another embodiment of the invention, a color video camera is aimed at surface of the structure just behind the area being irradiated. A trained, but not particularly skillful operator using the image produced by the video camera can then control the scan speed, repetition rate, peak output, or pulse width of the radiant energy source, and the particle stream and optionally the coolant flow over the structure to assure proper operation of the system. This manual control is possible because the operation of the present system is not critical. Generally, the operator slows the scan speed or increases the total irradiation until a proper removal is observed, and continues at that removal level until conditions change, such as might happen at a curvature or color change.

A significant advantage of the invention is that it produces a coating removal technique that is gentle and benign to underlying substrates. The radiant energy is preferably pulsed visible and or ultraviolet light that heats the coating, causing it to pyrolyze. Pyrolysis reduces the cohesion of the material to itself and its adhesion to the underlying substrate. The pyrolyzed coating is removed using a relatively low-power particle stream. Because the pyrolyzed material does not adhere well to the surface of the substrate, a relatively low-energy particle stream is able to dislodge the pyrolyzed coating from the substrate. The preferred particle stream is formed from $CO_2$ pellets that act both as the abrasive agent and the coolant. The resulting system can produce a combination process that is more benign as well as more efficient than either a uncooled more energetic pulsed light or particle jet based process alone.

The invention is ideally suited for removing coatings from any substrate, including delicate, thin, or composite substrates. Another advantage of the invention is that it may be economically employed to remove coatings from large areas under the control of a data processor.

Therefore it is a principle object of the present invention to provide an apparatus for removing paints and other coatings from substrates that are easily damaged by other devices.

Another object is to provide a paint removing system that is relatively economical to manufacture, operate, and maintain.

Another object is to provide an apparatus that can remove outer RAM coatings from adjacent fragile and extremely expensive radar absorbing structure (RAS).

Another object is to provide a paint removing system that is easily controlled, even by relatively unskilled personnel.

Another object is to provide an apparatus to remove coatings from fragile substrates using radiant energy, that directs most of the radiant energy produced to the surface coating.

These and other object and advantages of the present invention will become apparent to those skilled in the art after considering the following detail specification together with the accompanying drawings wherein:

BRIEF DESCRIPTION OF THE DRAWINGS

Throughout the specification and drawings, like components are referenced using like reference numerals.

DESCRIPTION OF THE PREFERRED EMBODIMENT

While the present invention is being described in terms of preferred embodiments, it is to be understood that the invention is not to be limited to the exact form of the apparatus or processes disclosed. Therefore, it is to be understood that the invention may be practiced other than as specifically described without departing from the scope of the claims.

First Embodiment

The first embodiment of the present invention provides a relatively gentle system 10 for removing coatings from a substrate. The system 10 irradiates the coating with pulsed radiant energy, such as light in the visible and/or ultra violet regions, sufficient to pyrolyze the coating to weaken the chemical bonds both within the coating and between the coating and the substrate. Thereafter the system 10 impinges the weakened coating with a low-energy particle stream of $CO_2$ pellets to physically dislodge the coating from the substrate, and to cool the substrate and the source of radiant energy. Pyrolysis weakens and breaks cohesive bonds in the coating and adhesive bonds between the coating and the substrate. The present invention is particularly well suited for removing paint from the surfaces of fragile substrates such as plastic, alclad aluminum, aluminum alloys, and composite materials. This embodiment is expected to find wide use in the paint removal industry.

Figure 1:
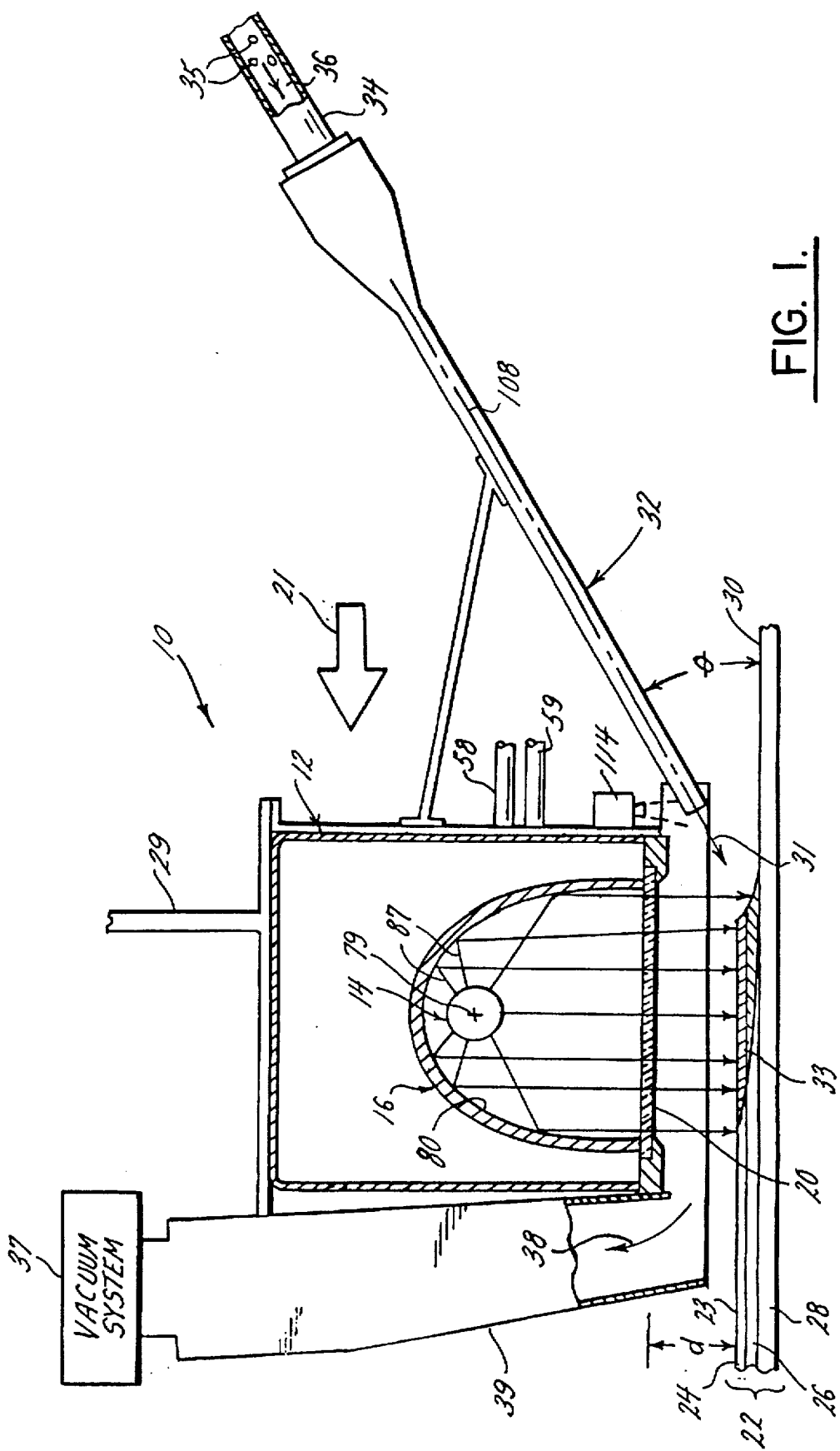
FIG. 1 is a schematic diagram of an a first embodiment of a system embodying various features of the present invention for removing a coating from a substrate by pyrolyzing and blasting the coating from the surface of the substrate.

Referring to FIG. 1, there is shown the system 10 particularly adapted for implementing the present invention. The system 10 includes a housing 12 in which is mounted a radiant energy source such as optical energy source 14 and a parabolic reflector assembly 16. The optical energy generated by the source 14 is directed and/or reflected off of the parabolic reflector 16 through a window 20 so as to irradiate a target area (see FIG. 5) as it is scanned in the direction of arrow 21 over a structure 22's surface 23. As an example, the structure 22 is comprised of layers 24 and 26 formed on a substrate 28. Although the structure 22 may include any number of layers, for purposes of illustration the structure 22 is described herein as having the two layers 24 and 26.

In this first preferred embodiment, the optical energy source 14 may be a broadband flashlamp. A flashlamp, or flashtube, is a gas-filled device, which converts electrical energy to optical energy by passing current through a plasma typically contained in a transparent tube through which the optical energy is transmitted. A broadband flashlamp generates optical energy having wavelengths, which may range from 170–5000 nm. Using broad spectrum energy increases the likelihood of absorption by various components and colors of the layers 24 and 26. A flashlamp offers the further advantage of being readily adaptable for irradiating relatively large areas at the same time.

The housing 12 is supported by a manipulator 29, which may be controlled to move housing 12 over the surface 23 of structure 22 at a standoff distance, d, in order to irradiate and scan the structure 22 with optical energy generated by optical energy source 14. The standoff distance d represents the perpendicular distance between the window 20 and the top surface 23 of structure 22. A CIMROC 4000 Robot Controller manufactured by CIMCORP Precision Systems, Inc., Shoreview, Minn. is an example of a suitable manipulation 29.

The intensity of light energy incident on structure 22 must be high enough that the light absorbed by the layers 24 and 26 heats them sufficiently to weaken and/or break the chemical bonds in the molecules of the material comprising the layers 24 and 26 in a process referred to as pyrolysis. The breakdown weakens the material within the layers 24 and 26 the adhesion of the material to itself and to the substrate 28, facilitating the removal of the material. The depth of heating resulting from a single light pulse is a function of the average intensity and pulse width of the optical energy source 14, the stand-off distance of the optical energy source 14, the scan rate of the optical energy source 14 across the surface of the structure 22, the thickness of the layers 24 and 26, the size of the reflector 16, and the thermal characteristics of the materials comprising the layers 24 and 26. A major advantage of the invention is that the system 10 can control the depth of heating as explained more fully herein, so that layers 24 and 26 can be removed from the surface 30 of substrate 28 without subjecting the substrate 28 to potentially damaging heat build-up. Damage would be evidenced by permanent changes in the shape or in the mechanical properties of the substrate 28, such as the modulus of elasticity, shear strength, and tensile strength. Such changes in the shape or in the mechanical properties of the substrate 28 are undesirable.

A particle stream 31 is ejected from nozzle 32 and directed to impinge the pyrolyzed portions 33 of layers 24 and 26 so as to dislodge the pyrolyzed portions 33 of the layers 24 and 26 from the surface 30 of the substrate 28. The particle stream 31 is provided to the nozzle 32 via duct 34 from a particle supply, not shown. The particle stream 31 may be composed of gases, liquids, or solids, as for example, inert gas, dry air, water, water droplets, carbon dioxide gas, carbon dioxide pellets, walnut shells, and the like, or any combination of gas, liquid, or solids entrained in gas or liquid or solid. Most preferably, the particles 35 of the stream 31 comprise particles of a frozen gas, such as $CO_2$ or argon transported in cold gas 36. In some applications, it may be desirable to heat such transport gas 36 to prevent moisture in the surrounding atmosphere from condensing on the surface 23 of structure 22 in the area impinged by the particle stream 31 if the temperature of the surface 23 would otherwise drop below the dew point. In most cases however, heat from the radiant energy source 14 prevents condensation. Usually it is desirable for particle stream 31 to be at well below ambient temperature in order to quickly cool the material of the pyrolyzed portions 33 on the substrate 28, so that the substrate 28 does not sustain heat damage.

A low kinetic energy particle stream of frozen carbon dioxide particles 35 entrained in a dry, high pressure transport gas 36 has been found particularly suitable for removing paint and primer from aluminum and organic composite surfaces of aircraft. Frozen $CO_2$ particles are particularly desirable because they impart kinetic energy to the layers 24 and 26 and also function with the gas 36 to keep the substrate 28 cool, so that it is not damaged by the high temperatures generated by the flashlamp 14. It is believed that maintaining a temperature differential between the substrate 28 and the layers 24 and 26 enhances removal. The $CO_2$ particles 35 also help to cool and clean the window 20 of the flashlamp or other radiant energy source 14. It is believed that the frozen $CO_2$ particles 35 sublime upon or shortly after impact with the layers 24 and 26, and therefore, $CO_2$ is instantly separated from the material that has been removed from the substrate 28. Thus, the volume of waste that must be disposed of is greatly reduced over other particle blasting systems. Moreover, the resultant $CO_2$ gas creates a fire and explosion resistant environment around the removal site and also suppresses deleterious smoke and soot. An example of a suitable device for providing the frozen $CO_2$ particles is the Model 65-200 unit available from Cold Jet, Inc., Cincinnati, Ohio. The Cold Jet device is capable of providing frozen $CO_2$ in particles with diameters ranging from 0.080 in. to 0.140 in., with transport gas pressures of from 50 psig to 350 psig, and mass flow rates from 0 to 1500 lbs/hr. Other suitable devices for creating and delivering particle streams are disclosed in U.S. Pat. Nos. 4,947,592, 4,744,181, 4,843,770, 5,056,805, 5,018,667, and 5,063,015, incorporated herein by reference.

The nozzle 32 is mounted to the housing 12 so that as the housing 12 is translated across the structure 22, the optical energy source 14 scans different target areas on structure 22, with the nozzle 32 following. Thus, the material on the structure 22 is subjected to a continuous process whereby the optical energy source 14 scans the structure 22 to irradiate and pyrolyze selected target areas on the structure 22 while the particle stream 31 removes the still hot pyrolyzed material.

During this process, a vacuum system 37 draws the gases, spent particles, and dislodged pyrolyzed portions of the layers 26 and 24 (shown as arrow 38) away through a vacuum nozzle 39 connected to the housing 12 opposite the nozzle 32. Such vacuum systems are well known in the art.

The amount of radiant energy applied preferably is not great enough to ablate substantial amounts of layers 24 and 26 in the target area. Ablation is a process where so much energy is applied to a material, that in addition to breaking chemical bonds in the material to form smaller molecules, the resulting smaller molecules are quickly and violently vaporized. Although some ablation is to be expected when pyrolyzing organic substances, as typically comprise paints or epoxies, ablation is not the preferred mode of removal because it can result in tough "chars" that tenaciously hold to the substrate 28. The radiant energy is therefore preferably applied to substantially pyrolyze the layers 24 and 26 without substantial ablation. This can be accomplished by controlling the amount of energy applied with the radiant energy source 14 and/or by removing some of the energy applied by the radiant energy source 14 with the particle stream 31. For most materials that will be removed by the system 10, the intensity of incident light energy will generally be in the range of about 1 to 30 joules/$cm^2$ at a FWHM pulse of about 1500 microseconds. The amount of radiant energy applied to the surface 23 of the structure 22 is easily controlled, primarily by employing an optical energy source 14 having a suitable output, and secondarily by establishing a suitable standoff distance between the surface 23 of the structure 22 and the source 14 of radiant energy and an appropriate scan rate.

Figure 2:
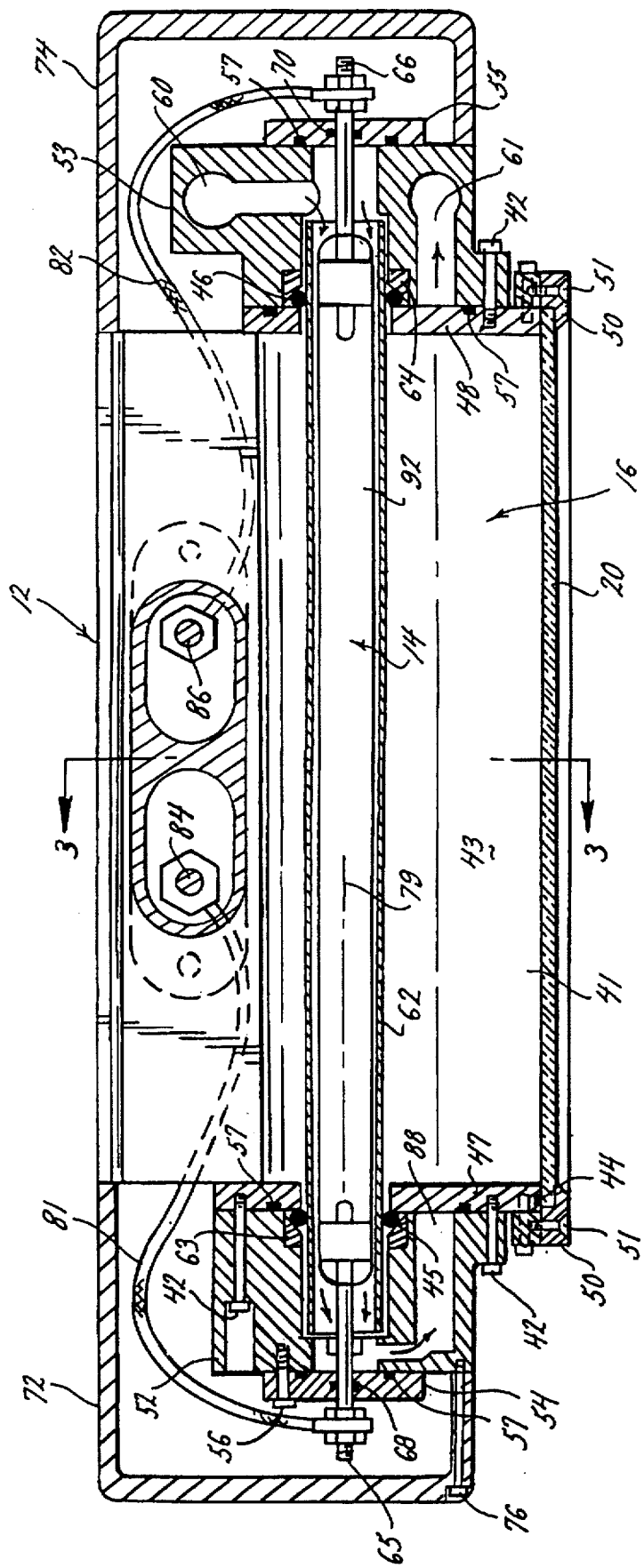
FIG. 2 is a vertical cross-sectional view of the housing in which the light source and reflector are mounted.
Figure 3:
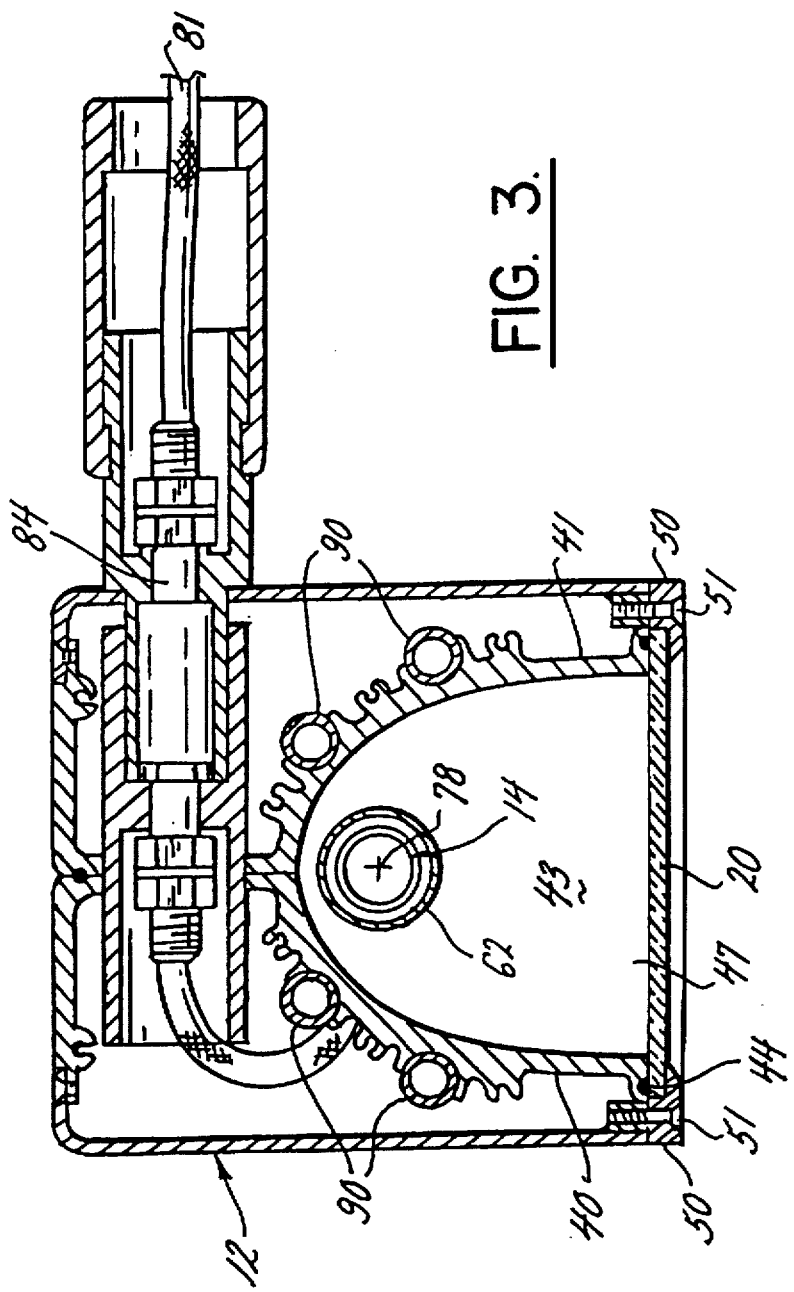
FIG. 3 is a vertical cross-sectional view of the housing taken along the plane of line 3—3 in FIG. 2.

FIG. 2 is a vertical transverse cross-sectional view of the system 10 for implementing the method of the first embodiment. FIG. 3, a vertical cross-sectional cut taken through the center of FIG. 2, provides additional details of the first embodiment. As shown in FIGS. 2 and 3, the housing 12, when attached to both halves 40 and 41 of reflector assembly 16 with means such as screws 42, comprises the main body of the stripping system 10 to which all other components are installed or are attached. The manipulator 29 attached to housing 12 controls operation of system 10 over structure 22. The housing 12 is preferably made from black, hard anodized aluminum except in areas thereof subject to reflected light energy, which are given a reflective finish.

The interior 43 of the reflector assembly 16 is hermetically sealed by the lower closure window 20 (through which energy from optical energy source 14 is transmitted) and seals 44, 45 and 46. Window 20 is secured against seal 44, housing 12, reflector assembly 16, and reflector assembly inner end plates 47 and 48 by retainers 50 and screws 51. The end plates 47 and 48 (machined to mate with ends of reflector assembly 16), the end cooling manifold blocks 52 and 53 and outer end plates 54 and 55 are secured to the reflector assembly 16 by suitable means such as the screws 42 and 56. A water tight seal between blocks 52 and 53 and outer end caps 54 and 55 is achieved by seals 57.

The optical energy source 14 and reflector 16 are preferably cooled by deionized water provided from a water supply (not shown) to the interior of the housing 12 through an inlet tube 58 and returned through an outlet tube 59 respectively attached to inlet manifold 60 and exhaust manifold 61.

Cooling water for optical energy source 14 is contained by a quartz water jacket 62 supported within the inner end plates 47 and 48. A fluid tight seal is maintained between end plates 47 and 48 and water jacket 62 by O-ring seals 45 and 46 and compression collars 63 and 64 which are in turn supported by the manifold blocks 52 and 53 respectively.

The optical energy source 14 is installed within the quartz water jacket 62 and supported at each end on terminals 65 and 66 by seals 68 and 70 contained within end caps 54 and 55. End caps 54 and 55 are sealed for coolant containment against the manifold blocks 52 and 53 by seals 57 and secured with screws 56. Personnel protection/damage prevention for optical energy source terminals 65 and 66 is provided by housing end covers 72 and 74 secured by screws 76.

Reflector assembly 16, disposed around the optical energy source 14, preferably has an parabolic cross-section, as best shown in FIG. 3, in which case the longitudinal axes 78 of the optical energy source 14 and the water jacket 62 coincide with the line of foci 79 of the reflecting surface 80 of the reflector assembly 16.

Electrical power to energize the optical energy source 14 is provided by high voltage coaxial cables 81 and 82 that extend into housing 12 through cable fittings 84 and 86. When energized, light (shown as arrows 87) from optical energy source 14 is transmitted through the quartz water jacket 62. Such light 87 either passes directly through window 20, or is reflected off the reflective surface 80 then through window 20. The window 20 preferably is also made of fused quartz because fused quartz has excellent transparency, does not degrade upon exposure to ultraviolet light, and has a high tolerance to heat.

As aforesaid, the optical energy source 14 and reflector assembly 16 preferably are cooled by circulating deionized water thereabout. For example, water at a temperature of about 50° F. provided at a flow rate of about 2 gpm is normally adequate to cool a optical energy source 14 and the reflector assembly 16 operating at the 1500 joules heat load that is normal. The water is preferably deionized so that it has an electrical resistance greater than about 1 MΩ and does not appreciably conduct current through the water jacket 62. The cooling water is provided from a suitable source (not shown) through the inlet supply tube 58 and inlet manifold 60, between the water jacket 62 and optical energy source 14, through a manifold 88 in manifold block 52, through reflector cooling tubes 90 (FIG. 3) through the outlet manifold 61 and out the outlet tube 59. Heat generated by operation of optical energy source 14 is absorbed by the water, which is circulated to the water supply for cooling back to 50° F. and recirculation.

It is well known that in order to maximize the service life of a flashlamp (optical energy source 14), the operation of the flashlamp should be critically damped, that is, it should be operated with a dampening coefficient of about 0.77. Factors that determine the dampening coefficient of a flashlamp include: inductance of the single mesh pulse forming network (PFN) typically employed in the flashlamp power circuit, capacitance, C, of the PFN, arc length of the flashlamp, and operating voltage, V, across the terminals of the flashlamp. The energy output, E, of a flashlamp is characterized by the relation $E=\frac{1}{2}CV^2$. However, to maximize service life, V should be varied by no more than about five percent from the optimum voltage. Further, it is not practical to vary C because of the expense of additional capacitors and switches required to implement such a circuit and because of the life-limiting character of this type of circuit. Therefore, in order to maximize the useful life of flashlamp 14, the flashlamp is preferably operated at a constant repetition rate and a fixed pulse width.

By way of example only, the flashlamp 14 may include a transparent tube 92 filled with xenon gas at a pressure of 60 KPa, and having an overall length of 28 cm, a 7 mm inside diameter, 9 mm outside diameter, and a 15 cm arc length. Typical pulse lengths for a xenon flash lamp are between 1 µsec and 5 msec. The rate of energy applied per unit area is preferably less than the ablation threshold, i.e., the light applied per unit area per unit time preferably is insufficient to remove the coating by ablation. The energy required by this system for a given coating on a given substrate can be readily empirically determined. Medium level bursts of energy (on the order of 9–12 J/cm$^2$) are typical as compared to the 18–25 J/cm$^2$ required to substantially ablate the coating. This particular flashlamp 14 is preferably operated at a repetition rate of 4–5 Hz, and has a full-width, half-maximum (FWHM) fixed pulse width of about 1500 microseconds and an input energy of about 100–120 joules/cm of arc length, although in some circumstances it might be desirable to have a greater repetition rate and a shorter pulse width. As is characteristic, the useful output energy of a flashlamp available to irradiate the surface 23 of structure 22 (see FIG. 1) is approximately 20–25 per cent of the input energy to the flashlamp. The flashlamp 14 is powered by a suitable power supply, not shown, as would be known by those of ordinary skill in the art.

Because the flashlamp 14 is operated with a damping coefficient of about 0.77, the preferred method of controlling the energy flux (joules/unit area) at the surface 23 of structure 22 is to control the distance between the flashlamp 14 and the surface 23 of the structure 22. The energy intensity incident at the surface 23 of the structure 22 is generally inversely proportional to between the distance and the square of the distance between the surface 23 and the flashlamp 14. The distance between the flashlamp 14 and the surface of structure 22 is more conveniently discussed with reference to the standoff distance, d, between the surface of the structure and the window 20, because the distance between the window 20 and the flashlamp 14 is fixed.

Figure 4:
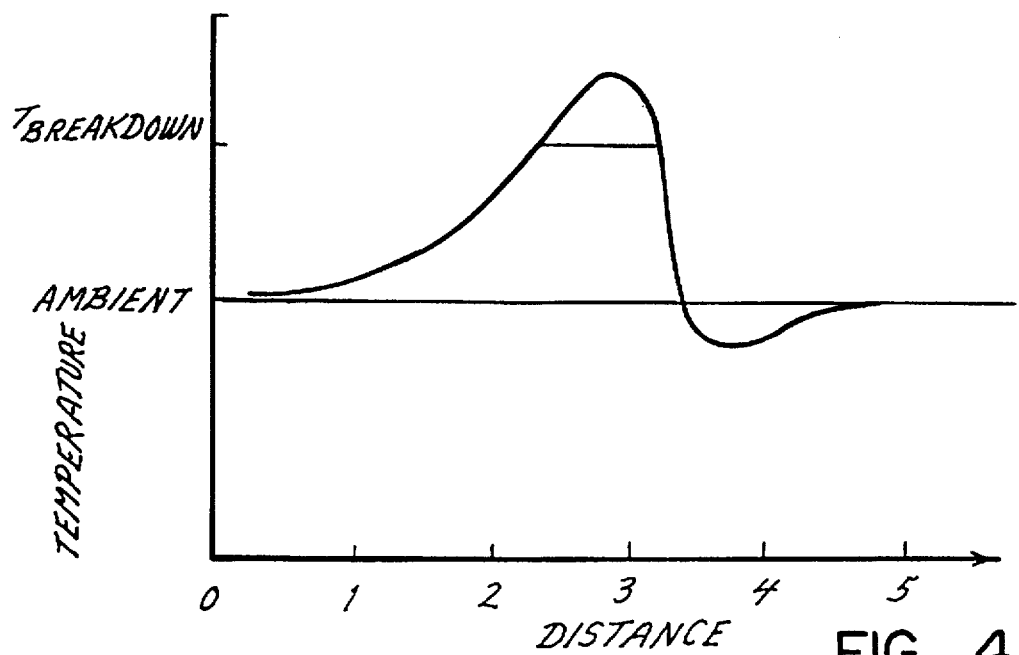
FIG. 4 is a graph showing a qualitative temperature profile along a path on the structure resulting from irradiating a target area of the structure with the light source and cooling the target area with a particle stream.

The temperature of layers 24 and 26 is a function of the optical energy output of the flashlamp 14 that is absorbed by the layers, the repetition rate of the flashlamp (or of any other radiant energy source), the albedo of the surface layer (dark colored surfaces absorb light better than light colored surfaces); the relative speed (also referred to as the scan rate) of the flashlamp 14 along the surface 23 of the structure 22, the distance between flashlamp 14 and the surface 23 of structure 22, the temperature of particle stream 31, and the mass flow rate of the particle stream 31. However, as noted above, to maximize the service life of flashlamp 14, the flashlamp 14 preferably is operated at a constant repetition rate. It is generally not practical to vary the temperature of a particular particle stream. Therefore, control of the temperature of layers 24 and 26 is preferably effected by first determining a suitable scan rate, and then an appropriate standoff distance for a particular structure and thereafter adjusting the scan rate for varying characteristics such as layer thickness changes or color differences. The temperature may also be controlled by the selection of the mass flow rate of the particle stream 31. The thermal effects of light energy on the structure 22 are graphically presented in FIG. 4 showing how the temperature of the substrate 28 rises to a value ($T_{breakdown}$) where the layers 24 and 26 are pyrolyzed and then is cooled by the particle stream 31.

Figure 5:
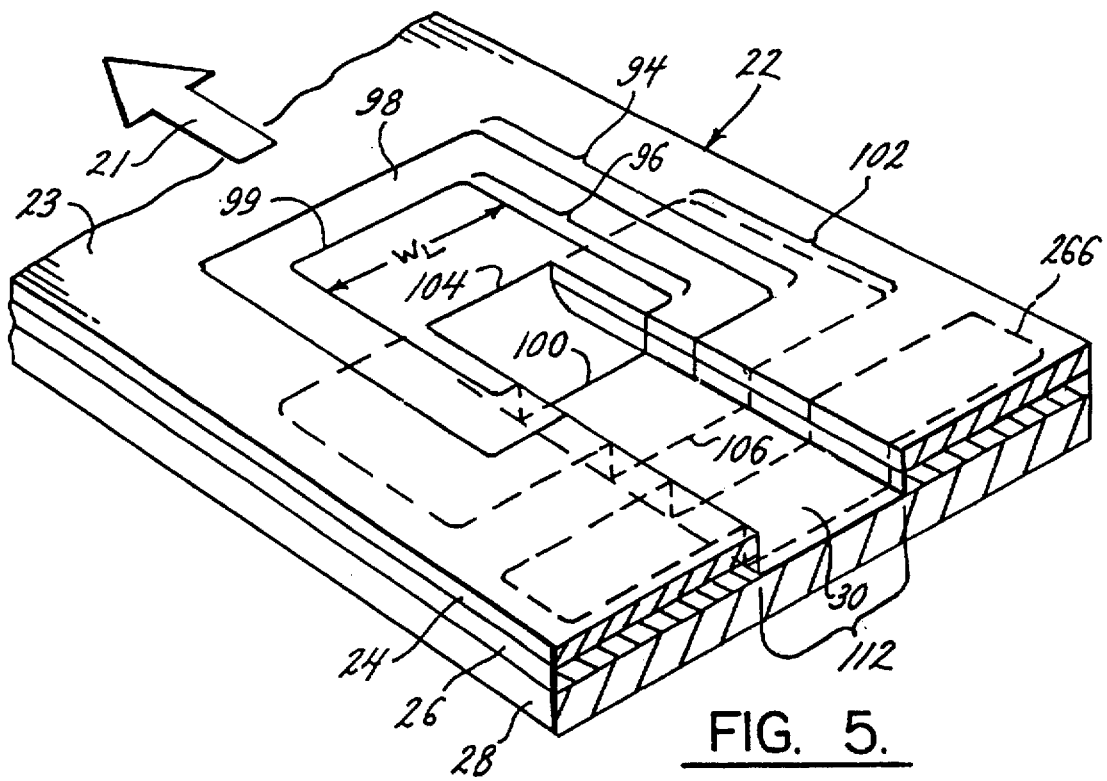
FIG. 5 illustrates the target area of the light source and the footprint of the particle stream on the surface of the structure.

Referring now to FIG. 5, light energy directed on the surface 23 of structure 22 results in an illuminated area 94 on the structure 22. Area 94 includes the focus or target area 96, having a width $W_L$ that is subjected to the more intense irradiation and is surrounded by penumbra area 98 which is subjected to less intense irradiation. As the optical energy source 14 scans across a path on the surface 23 of the structure 22 in the direction of arrow 21, the portions of the layers 24 and 26 subjected to the more intense irradiation in the target area 96 are pyrolyzed. The area 96 has a leading edge 99 and a trailing edge 100. For purposes of illustration, the area 96 is shown to be substantially rectangular, however, the shape of area 96 depends on the particular configuration of reflector 16, which may be selected to suit the requirements of a specific application.

Figure 6:
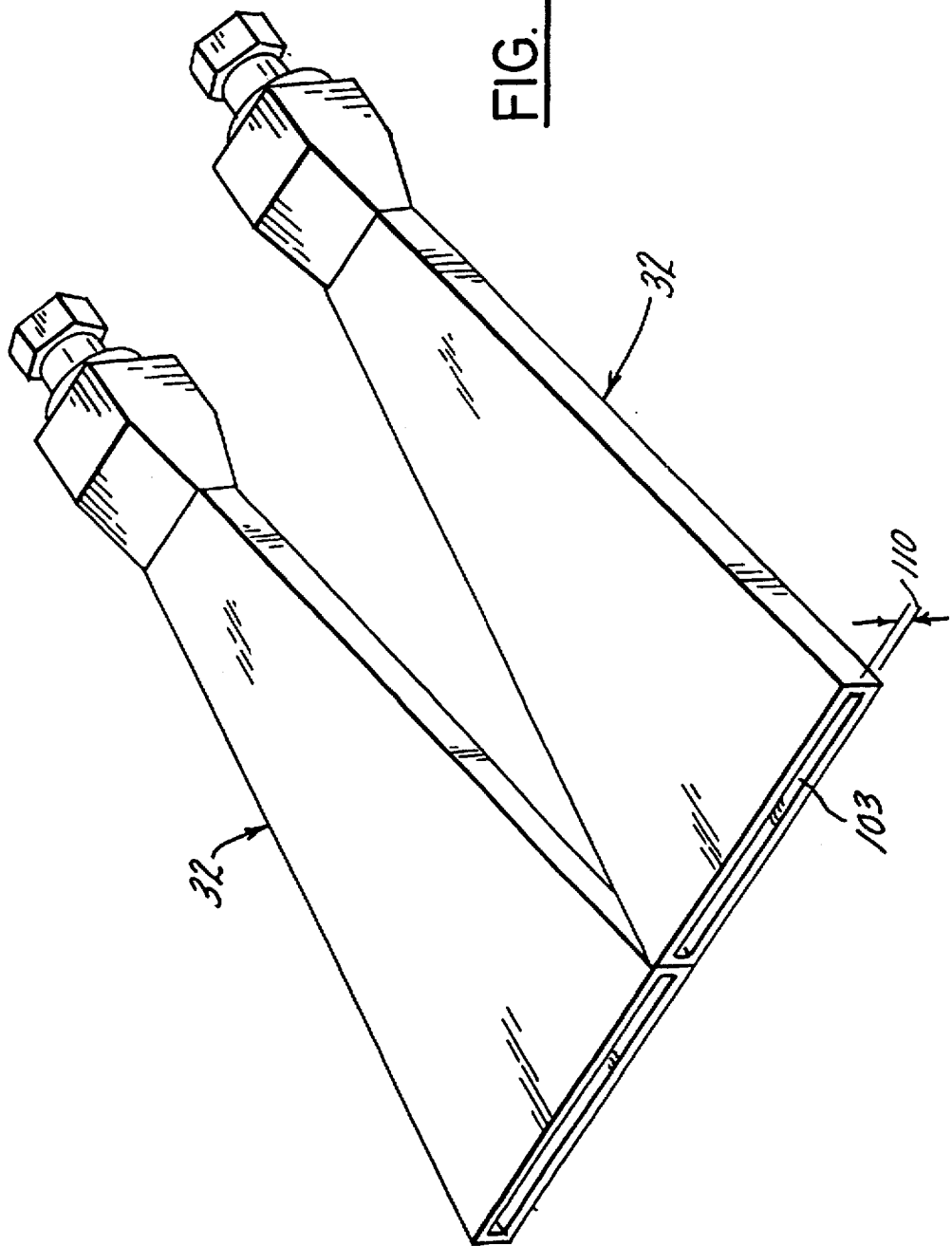
FIG. 6 is a perspective view of the nozzle through which the particle stream is ejected.

As the optical energy source 14 scans the path on the surface 23 of the structure 22, the particle stream 31 (not shown in FIG. 5) impinges and scans the surface 23 in the direction of arrow 21 with a pattern or footprint 102 that is determined by the size and shape of the outlet 103 of nozzle 32, shown in FIG. 6. Preferably, the footprint 102, having a leading edge 104 and a trailing edge 106, overlaps a portion of the target area 96 such that the leading edge 104 of the footprint 102 is just slightly ahead of the trailing edge 100 of the target area 96 in order to assure that particle stream 31 impinges pyrolyzed portions of the layers 24 and 26. In other words, the target area 96 of the optical energy source 14 and the footprint 102 of the particle stream 31 may slightly overlap. In this case the particle stream 31 simultaneously impinges at least a portion of the target area 96 while it is being irradiated with optical energy. However, it is to be understood that the leading edge 104 of the footprint 102 of the particle stream 31 may also impinge behind the pyrolyzed portions of the layers 24 and 26, with no overlap, provided that the portion impinged by the particle stream 31 is in a pyrolyzed state. In this case, the target area 96 is first irradiated by optical energy source 14, and then momentarily later, is impinged by the particle stream 31.

The effect of scanning the surface 23 of the structure 22 with the optical energy source 14 and the particle stream 31 results in removal of fragments of the layers 24 and 26 to expose some of the surface 30 of the substrate 28. The particle stream 31 removes the layers 24 and 26 at a depth generally corresponding to depth of heating caused by the high intensity pulsed radiant energy.

The shape of the footprint 102 is determined by the shape of the outlet 103 of nozzle 32 and the angle θ (FIG. 1), between the flow axis 108 of nozzle 32 and the surface 23 of the structure 22. The angle of incidence θ is selected to maximize the removal effect of the particles 35 for a specific application, while minimizing the impact of the particles 35 on the substrate 28. Moreover at the correct angle of incidence θ, $CO_2$ rebounding from the structure 22 tends to cool and clean the window 20 of the radiant energy source 14, enhancing its efficiency and extending its service life. In an example of the preferred embodiment, the shape of outlet 103 may be an elongated rectangle (as shown in FIG. 6), or oval. If the particle stream 31 is comprised of carbon dioxide pellets entrained in cool dry air, the minor width 110 of the outlet 103 must be sufficient for the pellets 35 to flow through the outlet 103 so that the outlet 103 does not clog from any condensing moisture or from the pellets themselves. If the housing 12 is wide to do a large path, multiple nozzles 32 may be provided to assure even impingement of the particle stream 31.

In general, a suitable scan speed and standoff distance for a particular structure 22 are determined experimentally. The structure 22 is scanned at an initial trial scan speed using the system 10 and methods described above with reference to FIG. 1. The initial trial scan speed is intentionally selected to be high enough that at the given intensity of optical energy at the surface 23 of structure 22, an insufficient amount of material from the layers 24 and 26 is removed. The high initial scan speed prevents too much optical energy from being delivered to structure 22 in a given time period. Then, the scan speed is decreased until, at the given incident intensity determined by the standoff distance, sufficient material is removed from the layers 24 and 26 so as to expose the surface 30 of substrate 28 in an undamaged condition. If at the slowest scan speed, layers 24 and 26 are not sufficiently removed from substrate 28, the standoff distance is reduced and a new set of scan speed tests are conducted, as described above. This process is repeated until a combination of scan speed and standoff distance results in removal of the layers 24 and 26 from the substrate 28 without damage.

For typical applications, the standoff distance is controlled to provide an incident intensity at the surface 23 of structure 22 in the range of 1–30 joules/cm$^2$. If the layers 24 and 26 are removed and the surface 30 of substrate 28 appears to be overheating, a faster scan speed may be tried. The maximum scan speed is limited by the performance characteristics of the manipulator 29. Typical scan speeds range from about 0.08 cm/sec to about 2.0 cm/sec. If the substrate 28 overheats at the fastest reasonable scan speed of the manipulator 29, then the standoff distance is increased.

The temperature of layers 24 and 26, as well as the temperature of substrate 28 can also be controlled to some extent by varying the selection of and mass flow rate of the particle stream 31 and the overlap of its footprint 102 on the target area 96, because the particle stream 31 can absorb heat energy from structure 22. Thus, if it were desirable to lower the temperature at the surface 30 of the substrate 28, whether or not overlying layers 24 or 26 have been removed, the mass flow rate of particle stream 31 or its overlap may be increased. However, the mass flow rate of the particle stream 31 must not be so great that it damages the surface 30 of substrate 28 nor the overlap so large that the layer 26 is not pyrolyzed. Conversely, in some circumstances it may be desirable to increase the temperature of layers 24 and 26 to assure that they are adequately pyrolyzed when they are impinged by particle stream 31. In such case, the mass flow rate of the particle stream 31 may be decreased and all overlap can be eliminated.

There can be cases where the layers 24 and 26 are transparent to the radiant output of the source 14 and the substrate 28 is a good absorber. This could cause the substrate 28 to overheat and the failure of layers 24 and 26 to pyrolyze. This situation can be corrected by lightly coating the outer layer 24 with carbon black (a non toxic absorber) in a heat conducting polymer film. The carbon black absorbs the radiant energy, and converts it to heat, which is conducted to the layers 24 and 26 either directly or by the film. The film of carbon black is quickly stripped off by the particle stream 31, but not before the layers 24 and 26 are darkened by the heat so that later pulses of radiant energy pyrolyze them if the initial conducted heat does not.

The operation of the present invention will be described with reference to FIG. 1. Initially, the manipulator 29 is positioned so that the standoff distance, d, between window 20 and the surface 23 of the structure 22 is such that the radiant energy flux provided by optical energy at the surface 23 of the structure 22 is sufficient to pyrolyze the layers 24 and 26 to be removed, but preferably to not substantially ablate them. The manipulator 29 is controlled to position the housing 12 such that optical energy source 14 is positioned over the target 96 area of the structure 22 from which the layers 24 and 26 are to be removed. Then, the particle stream 31 is directed to impinge the surface 23 of structure 22, and vacuum system 37 is started. Next, the optical energy source 14 is enabled and directed to irradiate the surface 23 of the structure 22, and the scanning of the surface 23 is initiated.

Pulsed optical energy incident on the target area 96 of the surface 23 of structure 22 is absorbed by the material forming layers 24 and 26 and converted to heat, causing layers 24 and 26 to pyrolyze. During this time, the particle stream 31 is directed to impinge on the pyrolyzed portions of layers 24 and 26. The kinetic impact of particle stream 31 on the pyrolyzed portions of the layers 24 and 26 causes these portions to be blasted into waste, shown by arrow 38, which is dislodged off of the surface 30 of substrate 28.

The vacuum system 37 draws the blasted waste and expended particle stream 31 through nozzle 39 to collect and remove them from the vicinity of the target area 96 at the surface 23 of structure 22. Exposure of additional target 96 areas of substrate 28 is accomplished by moving or scanning the housing 12 so that optical energy source 14 scans structure 22 in the direction of arrow 21. Optical energy source 14 is directed to scan structure 22 until the desired area of substrate 28 has been stripped, at which time the system 10 is shut down.

The process may be controlled in real time by an operator using visual feedback based on observation of the trail 112 of exposed surface 30 of the substrate 28. Such visual feedback may, for example, be provided by direct observation, by a video camera 114 or pluralities of photodiode arrays 115. In the case of direct observation or observations by means of a video camera 114, the operator may control manipulator 29 using servos, not shown, so that the optical energy source 14 scans the structure 22 at a rate sufficient to remove the layers 24 and 26. If the operator observes that insufficient material is being removed at a particular region, the scan speed of manipulator 29 may be decreased and/or the standoff distance may be reduced. If manipulator 29 is a computer controlled robotic positioner, optical energy source 14 may be directed to traverse a predetermined path at a speed controlled by a computer, not shown, in accordance with techniques well known by those skilled in the art.

The thermal effects of light energy on structure 22 are graphically presented and described with reference to FIG. 4. As the housing 12 moves in the direction of arrow 21, light energy first irradiates the structure 22. The light energy is absorbed by layers 24 and 26, and, to some extent, the substrate 28.

Each pulse typically heats a thin layer of a coating to a depth of about 0.25 mil to about 1 mil. Since paint coatings on an aircraft usually are between 2 and 8 mils thick, and more typically between 6 and 8 mils thick, several pulses or flashes are required to pyrolyze and remove the entire thickness of a coating. This is achieved by coordinating the scan speed and the pulse rate. The depth of the heating can be fairly well controlled in this fashion, which helps to avoid damage to the substrate 28. In FIG. 4 position 0, with reference to distance (the units are arbitrary) along the length of structure 22, well in advance of the thermal influence of the light energy, the structure 22 is at ambient temperature. The temperature of the structure 22 increases (position 1) from ambient temperature toward the leading edge 99 the target area 96 and reaches a maximum just after the optical energy source 14 passes directly thereover (position 2), as would be expected. As the temperature along the length of structure 22 subjected to the most radiation increases above a minimum molecular breakdown temperature, ($T_{breakdown}$), the material in layers 24 and 26 pyrolyzes, breaking down into smaller molecules. These smaller molecules have less adhesion to each other and to the substrate 28.

The pyrolyzation threshold temperature depends upon the particular materials comprising layers 24 and 26. As represented in FIG. 4, the layers 24 and 26 are pyrolyzed approximately between positions 2.3 and 3.2. The particle stream 31 is generally oriented so as to impinge the pyrolyzed portion before it cools below the molecular breakdown temperature as light source 14 scans forward to irradiate a new target area. As housing 12 continues to move in the direction of arrow 21, the temperature of structure 22 decreases rapidly because the previously irradiated portions of the structure 22 are cooled by the particle stream 31. If the temperature of particle stream 31 is below ambient temperature, as would be the case if particle stream 31 were comprised of frozen carbon dioxide pellets entrained in air, the temperature in the vicinity of the region so impinged may actually decrease below ambient temperature. At about position "5", well behind the influence of either the light energy or the particle stream 31, the structure 22 returns to ambient temperature.

EXAMPLE 1

To demonstrate the removal of materials from a substrate using the methods and system of present invention, an experiment was conducted to remove paint from a structure comprising a 0.08 cm thick aluminum substrate on which was formed an epoxy primer painted with a polyurethane topcoat. The results of the experiment were successful in that the primer and topcoat were removed without damaging the surface of the thin aluminum. The total thickness of the primer and topcoat varied from about 0.010 to 0.020 cm. The structure was irradiated with a xenon flashlamp from a distance of about 1.3 cm. The flashlamp had an arc length of 15.24 cm and an energy input of about 1200 joules (76 joules/cm), a repetition rate of 3 Hz and a FWHM pulse width of 1500 μs. Energy was provided to the flashlamp by a single mesh pulse forming network power circuit having the following operating parameters: C=700 μF, V=–1800 V, and L=965 μH (circuit inductance). The simmer current, I, that kept the flashlamp ionized, was 2 amps. The incident intensity of the output of the flashlamp at the surface of the structure was 3 joules/cm² and cast a 5.0 cm wide beam that scanned the surface of the structure at a rate of 0.08 cm/second. This scan rate and beam width, $W_L$, resulted in a material removal rate of 0.40 cm²/second. The structure was blasted with frozen carbon dioxide pellets having a temperature of about –109° F., at a mass flow rate of 11 kg/hr, entrained in dry air having a back pressure of 1700 KPa.

Second Embodiment

The second embodiment also provides a benign process and system for removing coatings from a substrate without damaging the substrate. However, in addition to the system 10 described with regard to the first embodiment, the second embodiment further features a digital data processor, which coordinates and controls the scan rate of optical energy source 14 and particle stream 31 across the surface of structure 22. Control is effected using feedback provided by a photodetector circuit 116 that detects the optical character of the surface 23 of the structure 22.

Figure 7:
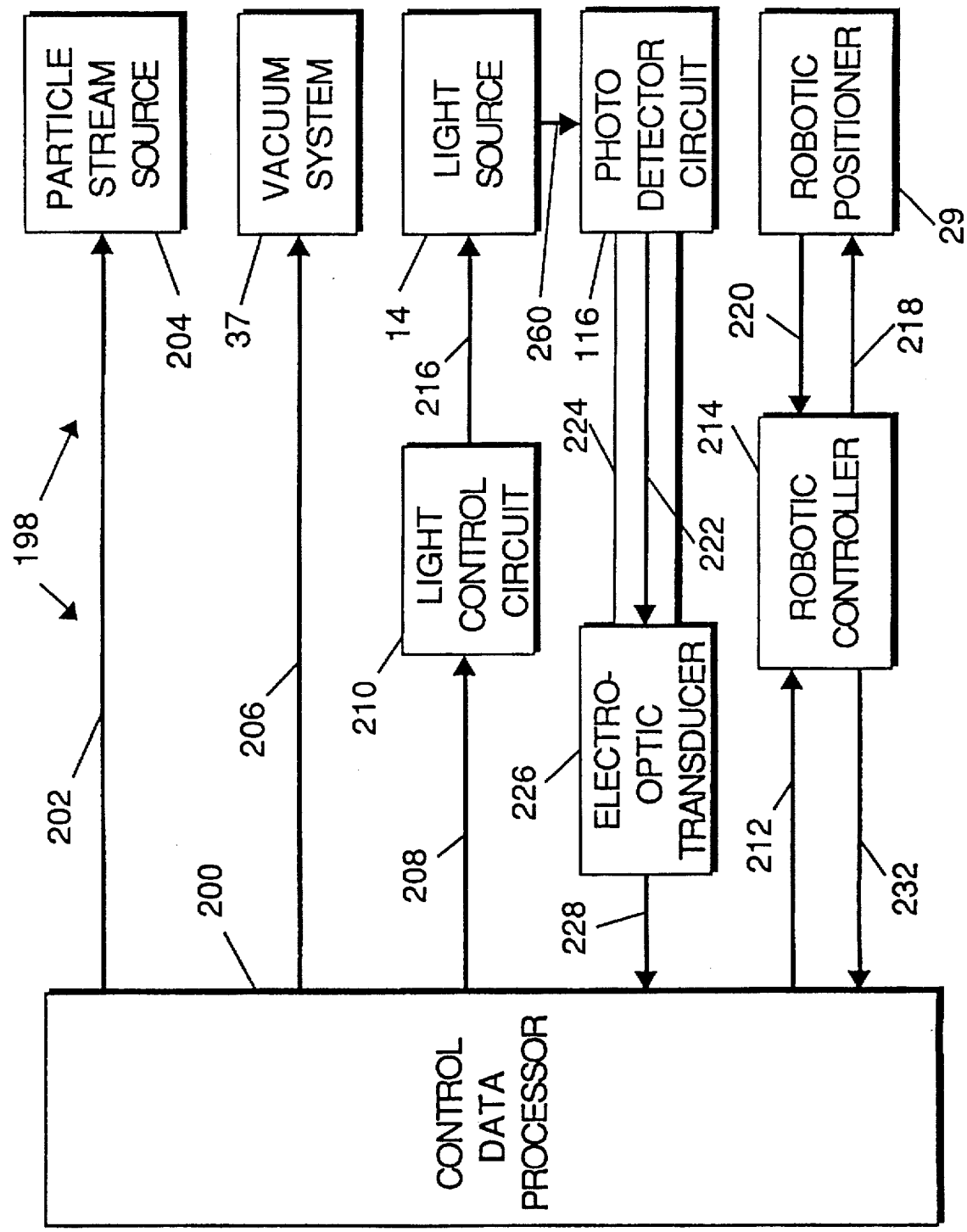
FIG. 7 is a block diagram of a second embodiment of a system embodying various features of the present invention, which employs a photodetecting circuit that generates feedback used to control the removal of the coating.

Referring to FIG. 7, which is a block diagram of system 198 embodying features of the second embodiment, data processor 200 generates output signal 202 to enable a particle stream source 204; output signal 206 to enable the vacuum system 37; output control signal 208 to control a light control circuit 210 (which may be of a type well known by those skilled in the art); and output signal 212 to provide path and speed instructions to a robotic controller 214. The data processor 200 may be, for example, an IBM AT or AT compatible personal computer. The light control circuit 210 generates a control signal 216 which establishes the repetition rate and pulse width of the output of optical energy source 14. The robotic controller 214, responsive to signal 212, generates control signals 218 that direct the path and speed of robotic positioner 29, which feeds back position signals 220 thereto. Photodetector circuit 116 detects the optical condition at the surface 23 of the structure 22 and generates optical feedback signals 222 that are conveyed by a optical fiber 224 to an electro-optic transducer 226. The transducer 226 transforms the optical signals 222 into corresponding digital electronic signals 228, which are combined by data processor 200 into the composite output signal 212. The robotic controller 214 transforms a component of composite signal 212 into instruction signal 218 that directs robotic positioner 29 to scan the radiant energy source 14 and the particle stream 31 across the surface 23 of the structure 22.

The path commanded by the output 218 of the robotic controller 214 is determined in accordance with a suitable path generating processing routine that is implemented by data processor 200 in accordance with techniques well known by those skilled in the art. The controller 214 provides a signal 232 to the data processor 200 to feed back the position of the robot positioner 29.

Figure 8:
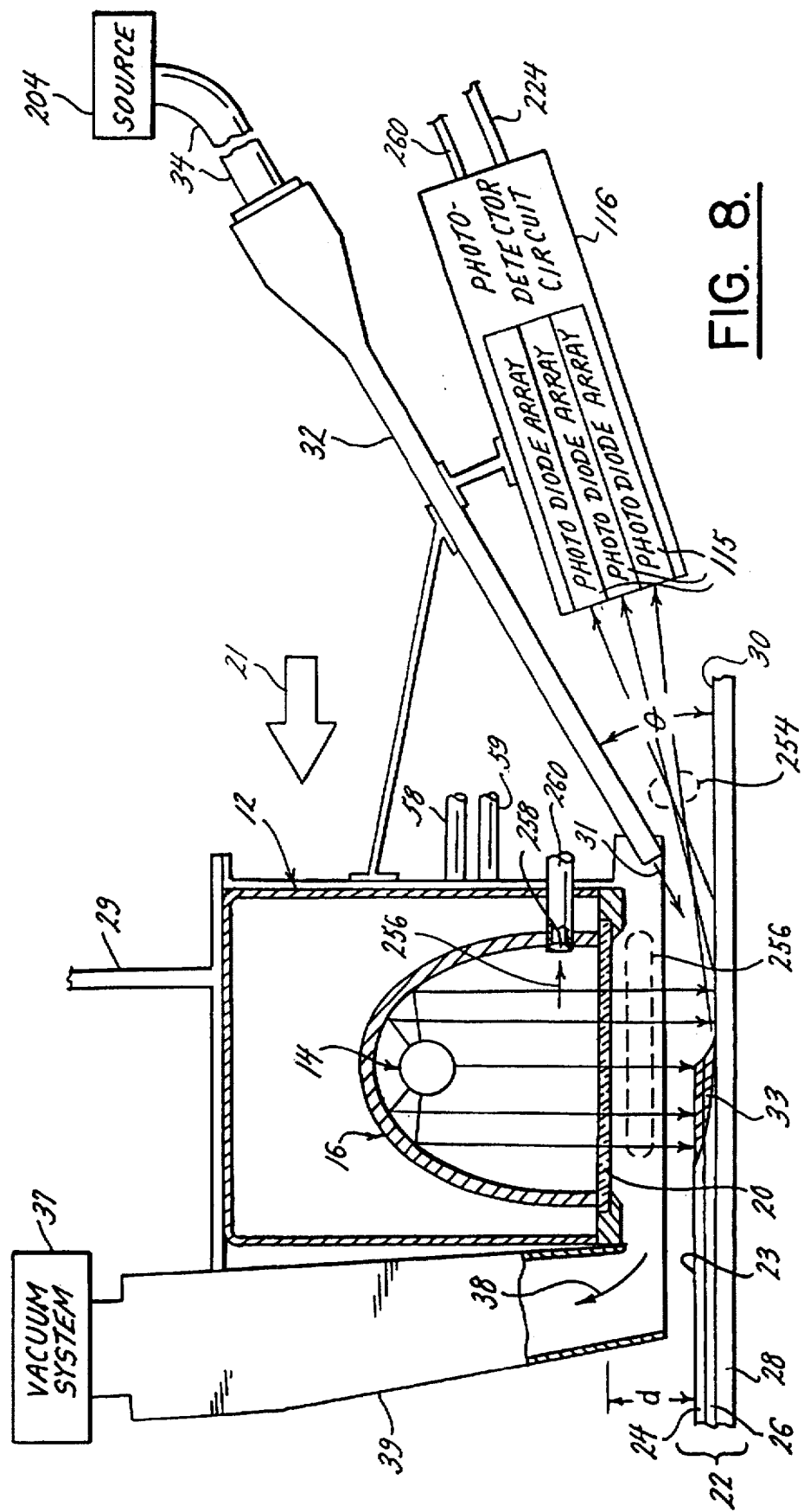
FIG. 8 is a diagram of an apparatus embodying various features of the present invention for removing a coating from a substrate by pyrolyzing and blasting the coating from the surface of the substrate, which includes optical feed back to control the coating removal process.

Referring to FIG. 8, there is shown housing 12, optical energy source 14 and reflector 16, as described above with regard to the first embodiment and as shown in FIG. 1.

Housing 12 is supported by robotic positioner 29 at a predetermined standoff distance from the surface 23 of structure 22. The standoff distance is determined as described further herein. Robotic positioner 29 is controlled to move housing 12 along a predetermined path, at a controlled scan speed, over the surface 23 (see FIG. 5) of the structure 22 so that optical energy source 14 and particle stream 31 may be directed to irradiate and impinge, respectively, the coating or layers 24 and 26 formed on the surface 23 of the substrate 28. The robotic positioner 29 may be a CIMROC 4000 Robot Controller manufactured by CIMCORP Precision Systems, Inc., Shoreview, Minn. The scan speed is related to the output signal 228 by a monotonic increasing function bounded by upper and lower limits, as described more fully below. The material (shown by arrow 38) removed from the surface 23 of substrate 28, and the expended particle stream 31, are collected by the vacuum system 37 through nozzle 39 mounted to housing 12.

The particle stream 31 is provided by particle stream source 204, which may provide gas, liquid, or solid particles, or any combination of particles. For example, particle stream source 204 may be a gas tank if particle stream 31 is a gas, or a carbon dioxide pellet source of the type commercially available from Cold Jet, Inc., if the particles are frozen $CO_2$ pellets. The particles, which comprise particle stream 31 are delivered to nozzle 32 via duct 34.

Figure 9:
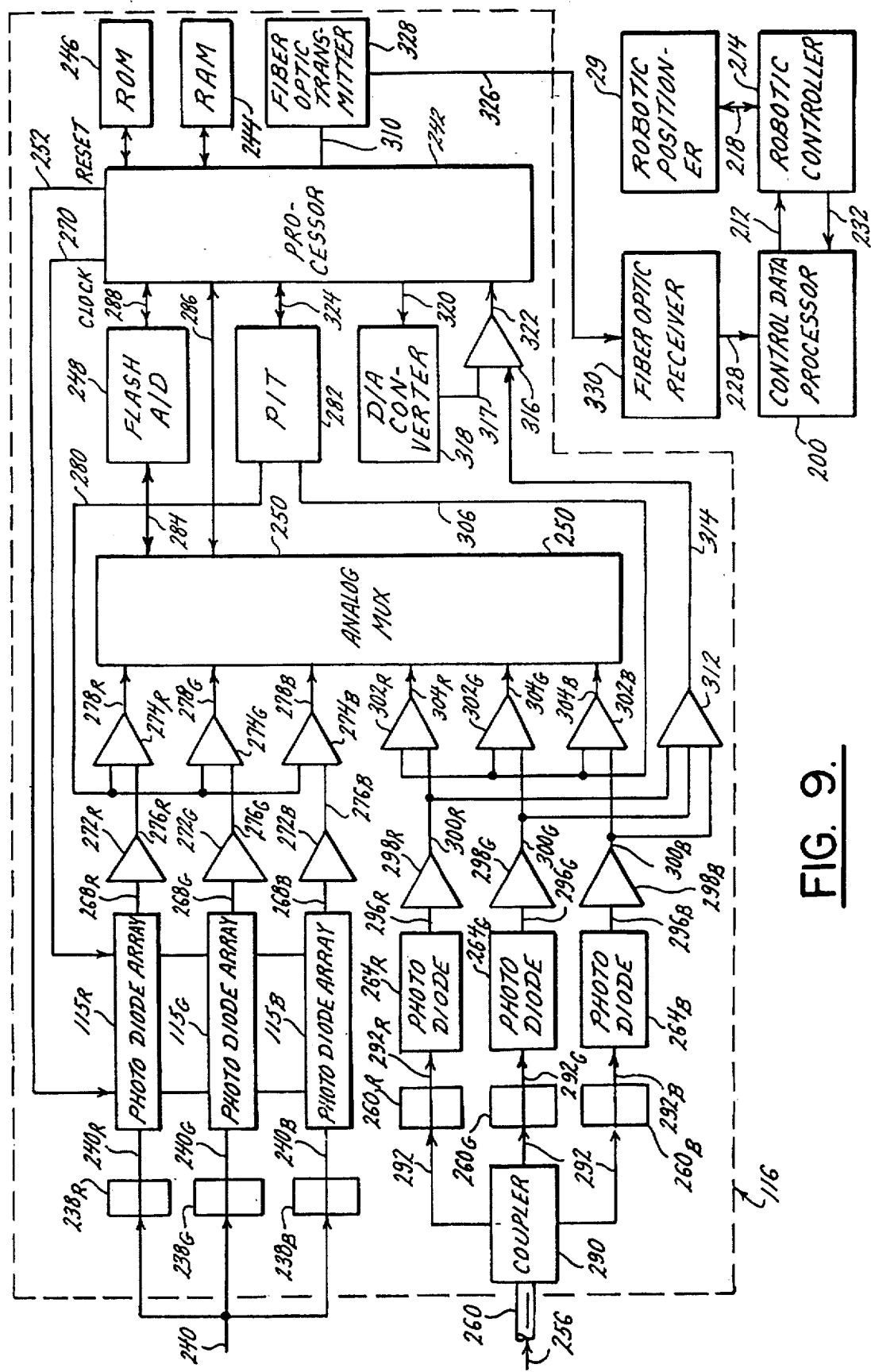
FIG. 9 is a block diagram of the photodetecting circuit.

Referring to FIGS. 7, 8, and 9, photodetector circuit 116 is mounted to nozzle 32 and detects the optical character of the surface 23 of structure 22 and generates an optical, digital weighted sum average value (WSAV) output signal 222. The signal 222 is propagated via optical fiber 224 to the electro-optic transducer 226, which then converts signal 222 into digital electronic data signal 228. Converting the output of photodetector circuit 116 to an optical signal reduces the effects of electromagnetic interference on the quality of the data received by data processor 200.

Referring to FIGS. 8 and 9, photodiode circuit 116 is mounted to nozzle 32 such that filters $238_R$, $238_G$, and $238_B$ split reflected optical energy 240 from the surface 23 of the structure 22 into light signals $240_R$, $240_G$ and $240_B$, where the R, G or B subscript represents a particular narrowband optical wavelength or color associated with such wavelength, such as red, green, and/or blue. The filtered light $240_R$, $240_G$ and $240_B$ is provided to the photodiode arrays $115_R$, $115_G$, and $115_B$.

The heart of photodetector circuit 116 is a processor 242. Such processor 242 may be implemented using any suitable microprocessor circuit capable of operating at a modest clock speed, e.g., 5-10 MHz. By way of example, processor 242 may be implemented using an Intel 8×51FB imbedded processor. Coupled to the microprocessor 242 is a conventional random access memory (RAM) 244, a conventional read only memory (ROM) 246, a flash analog-to-digital (A/D) converter 248, and an analog multiplex circuit (MUX) 250. Each channel is designed to detect a particular characteristic wavelength, or band of characteristic wavelengths. For example, the channels may be respectively designed to receive and process wavelengths characteristic of the colors, red, blue and/or green. In this manner, photodetector circuit 116 is able to receive and analyze optical energy from selected portions, or from all, of the entire optical and/or ultraviolet portions of the electromagnetic spectrum.

The optical data received in each data channel is separated by the filters $238_R$, $238_G$, and $238_B$ and is continuously monitored by photodiodes contained in the photodiode arrays $115_R$, $115_G$ or $115_B$, respectively. Such optical data is temporarily stored in the photodiode arrays in response to receiving an appropriate reset signal 252 generated by processor 242. The output from each photodiode in an array, as explained more fully below, represents the light component received from a defined area or pixel of the reflection footprint, i.e., the monitored area of structure 22 from which reflected light 254 is received. The data temporarily held in the photodiode arrays $115_R$, $115_G$ and $115_B$ is then serially transferred, under control of the processor 242, through appropriate channels, including the MUX 250 and the A/D 248, into the processor 242. The processor 242 processes the data in a prescribed manner. For example, the processor 242 may divide the signals received in each data channel by a corresponding normalization signal obtained from a sample optical energy signal 256 of the light from source 14. As shown in FIGS. 8 and 9, sample optical signal 256 is provided to photodetector circuit 116 through lens 258 and fiber optic bundle 260, which may penetrate housing 12 as shown in FIG. 8. The optical signal 256 may also be provided to photodetector circuit 116 through a fused quartz tube, or light pipe, that penetrates housing 12 and is optically coupled to photodetector circuit 116 by an optical fiber bundle. The optical signal 256 is provided to filters $262_R$, $262_G$, and $262_B$. The filters $262_R$, $262_G$, and $262_B$ frequency split the optical signal 256 and provide it to photodiodes $264_R$, $264_G$, and $262_B$, respectively, for use in normalizing the amplitude of data stored in the photodiode arrays $115_R$, $115_G$, and $115_B$ so that the results of the data processing are independent of variations in the output of optical energy source 14.

As seen in FIG. 9, each optical data channel includes an optical filter $238_R$, $238_G$ or $238_B$ that attenuates all light except light having selected characteristic wavelengths that are reflected from the structure 22. Preferably, the reflected light 254 is received from a location (area 266 of FIG. 5) somewhat behind the footprint 102 on structure 22 which is impinged by particle stream 31. Filters $238_R$, $238_G$ and $238_B$ are available commercially from numerous vendors for any desired wavelengths. The light that passes through the filters $238_R$, $238_G$ and $238_B$ is received and temporarily held in the photodiode arrays $115_R$, $115_G$ and $115_B$. By way of example, the photodiode arrays may be 1 by $2^n$ photodiode arrays, where n is a positive integer, as for example 1 by $2^{10}$ or 1 by 1024. A photodiode array $115_X$ receives and transforms any light 240 transmitted through its filter $238_X$, into a series of electrical pulses $268_X$ having amplitudes corresponding to the intensity of the received light, as controlled by an appropriate clock signal 270 generated by the processor 242. The rate of the clock signal 270, by way of example, may range from 2-25 MHz. The electrical pulses $268_R$, $268_G$ and $268_B$ are amplified and scaled by amplifiers $272_R$, $272_G$ or $272_B$ respectively. Track-and-hold circuits $274_R$, $274_G$ or $274_B$, receive the output signals $276_R$, $276_G$ or $276_B$ of the amplifiers and generate DC analog signals $278_R$, $278_G$ or $278_B$ that correspond to the peak pulse amplitudes of signals $276_R$, $276_G$, and $276_B$ during a time a hold signal 280 is being received from a parallel interrupt timer (PIT) 282 controlled by the processor 242.

Analog signals $278_R$, $278_G$, and $278_B$ are coupled through MUX 250 to the flash A/D converter 248 over signal line 284. Control of MUX 250 is effected by signals 286 generated by processor 242. The A/D converter 248 thus generates a digital data stream 288 corresponding to the signals $278_R$, $278_G$, or $278_B$ that is directed as an input signal to processor 242. Processor 242, stores the digitized optical data thus received in RAM 244. ROM 246 stores a suitable operating program that controls the operation of the processor 242.

Photodetector circuit 116 also includes a plurality of reference light channels that each receive a sample 256 of the optical energy generated by optical energy source 14. An optical coupler 290 can be used to split optical energy 256 into three identical signals 292 whose color components are separated by filters $262_R$, $262_G$ and $262_B$ into signals $292_R$, $292_G$, and $292_B$ for transmission to photodiodes $264_R$, $264_G$ and $264_B$. The photodiodes $264_R$, $264_G$ and $264_B$ function like diodes in the photodiode arrays $115_R$, $115_G$, and $115_B$, transforming any light transmitted through the respective filter $262_R$, $262_G$, or $262_B$ into a series of electrical pulses $296_R$, $296_G$ and $296_B$ having amplitudes corresponding to the intensity of the transmitted light. The electrical pulses $296_R$, $296_G$ and $296_B$ are provided to amplifiers $298_R$, $298_G$ and $298_B$ respectively. The resulting scaled and amplified pulse trains $300_R$, $300_G$ and $300_B$ are directed to track-and-hold circuits $302_R$, $302_G$ and $302_B$ which generate DC analog output signals $304_R$, $304_G$ and $304_B$ representing the peak pulse amplitude of the amplified pulse trains in response to receiving a hold signal 306 from the PIT 282. The signals $304_R$, $304_G$ and $304_B$ thus generated for each sample channel are provided to the MUX 250.

Signals $304_R$, $304_G$ and $304_B$ are used to normalize the light detected through photodiode arrays $115_R$, $115_G$ and $115_B$ so that variations in the intensity of optical energy source 14 do not affect the processing of signals $278_R$, $278_G$ and $278_B$ into an appropriate output control signal 310.

As also seen in FIG. 9, a summing amplifier 312 sums the outputs $300_R$, $300_G$ and $300_B$ of the respective sample channel amplifiers $298_R$, $298_G$ and $298_B$. The resulting summed output signal 314 is directed to one input of a threshold detector 316. The other input of the threshold detector 316 is a reference voltage 317 that is generated by digital-to-analog (D/A) converter circuit 318 as a function of a digital reference signal 320 determined by the processor 242. The signal 317 is provided only during a sample window when the output of optical energy source 14 is between predetermined amplitudes. Hence, the threshold detector 316 receives the reference voltage that enables it to respond to the summed output signal 314 only during such sample window. If the summed output signal 314 exceeds the threshold reference voltage 317 during the sample window, which only happens during predetermined intervals in the pulse period of optical energy source 14, then the output 322 of the threshold detector 316 goes high and functions as an interrupt signal to the processor 242, causing it to enter a data sample mode. The sample window may be determined experimentally so as to enhance distinguishing reflected light 254 from the optical energy generated by source 14.

In the data sample mode, the processor 242 serially receives optical data from the photodiode arrays $115_R$, $115_G$ and $115_B$ through the optical input channels and stores such data in RAM 244. Such data results from incoming optical signal 240, which is filtered and then stored in the photodiode arrays $115_R$, $115_G$ and $115_B$ upon receipt of the reset signal 252 generated by processor 242. Also during the data sample mode, sample optical data may be received from the photodiodes $264_R$, $264_G$ and $264_B$ through the sample channels. The parallel interrupt timer (PIT) 282 controls the timing of the particular data streams, which are read by processor 242 and stored in RAM 244 by hold signals 284 and 306 so that, for example, data originating from a first input channel including photodiode array $115_R$ and photodiode $264_R$, are read together. PIT 282 similarly controls when data is output from track-and-hold circuits $302_R$, $302_G$ and $302_B$ upon receipt of a hold signal 320 from processor.

The hold signals 280 and 306 are generated in response to PIT 282 receiving a timing signal 324 from processor 242. Timing signal 324 is generated whenever a clock signal 270 is generated by the processor 242. Upon receipt of timing signal 324, PIT 282 performs a countdown to zero. When PIT 282 reaches zero, hold signals 280 and 306 are generated. Thus, processor 242 reads data from the second input channel that includes photodiode array $115_G$ and photodiode $264_G$, and from the third input channel, which includes photodiode array $115_B$ and photodiode $264_B$.

The processing routine stored in ROM 246 and implemented in processor 242 causes processor 242 to determine the quotients of: signals $278_R$, $278_G$ and $278_B$ divided by signals $304_R$, $304_G$ and $304_B$, in order to normalize the outputs of the photodiode arrays for variations in the intensity of the output of optical energy source 14. Signals $304_R$, $304_G$ and $304_B$ need be sampled only once every data sample cycle, e.g., once every 100 clock signals 270 if photodiode arrays $115_R$, $115_G$ and $115_B$ each have for example one hundred diodes. Such normalization allows photodetector circuit 116 to evaluate the optical character of the surfaces of structure 22 should the output of light source 14 vary over time.

The processor 242 generates the output signal 228 and transmits such signal to the control processor 200. If needed, such signal can be converted to an optical signal using an appropriate conversion circuit in order to allow the transmission of the signal to be done optically over a fiber optic transmission cable, thereby rendering the signal much more immune to electromagnetic interference. If so converted, an appropriate optical receiver circuit is used at the other end of the transmission line in order to convert the signal back to an electrical signal suitable for use by the control processor 200. Fiber optic transmitters and receivers suitable for such purpose may be implemented using, e.g., a Litton Fiber Optics Transceiver, Model EO3675-2.

By way of example, signal 326 may represent a weighted sum average, ($WSAV_{color}$), as determined by processor 242 in accordance with the equations below, where "color" corresponds to the narrowband portion of reflected light 254 detected by a particular photodiode array:

$$WSAV_R = \frac{\sum_{i=1}^{m}\left(\frac{\text{Signal }278_{Ri}}{\text{Signal }304_R}\right)}{m} \quad (1)$$

$$WSAV_G = \frac{\sum_{i=1}^{m}\left(\frac{\text{Signal }278_{Gi}}{\text{Signal }304_G}\right)}{m} \quad (2)$$

$$WSAV_B = \frac{\sum_{i=1}^{m}\left(\frac{\text{Signal }278_{Bi}}{\text{Signal }304_B}\right)}{m} \quad (3)$$

where i represents a particular photodiode in the photodiode arrays, m represents the number of photodiodes in photodiode arrays $115_R$, $115_G$ and $115_B$ and R, G, and B represent the red, green, and blue portions, respectively, of reflected light 254 as detected by the photodiode arrays $115_R$, $115_G$ and $115_B$, respectively. Thus, the weighted sum average for each channel corresponds to the average intensity of a given set of light data detected by a particular photodiode array.

The value of the weighted sum average (WSAV) from the optical channel detecting the information of interest may be used to determine an appropriate scan speed for optical energy source 14. For example, if photodiode array $115_R$ detects optical energy from the red portion of the visible portion of the electro-magnetic spectrum, and the optical characteristic desired to be detected from the surface of a structure, such as structure 22, is colored red, then the weighted sum average for the red channel is used to determine an the scan speed of the optical energy source 14, as described in greater detail further herein.

The electronic digital WSAV signal 310 is converted to an optical digital signal 326 by optic transmitter 328, and this signal 326 is propagated to a remote optic receiver 330 by an optical fiber. The optic receiver 330 converts the optical signal 326 into the electronic digital signal 228 which is received by control data processor 200. As noted above, converting the output of processor 242 from an electronic to an optical signal reduces the effect of electromagnetic radiation from affecting the quality of the data received by the control data processor 200.

The processor 200 uses the value of WSAV as encoded in signal 228 as an address to a look-up table stored in processor 200 having address cells that each contain scan speed values corresponding to the value of signal 228. The contents of an addressed cell are retrieved and transformed into suitable scan speed control output that comprises, in part, signal 212, provided by data processor 200 to robotic controller 214.

The data processor 200 provides a composite control signal 212 which also includes path control instructions. Thus, composite signal 212 provides both path and speed control instructions to robotic controller 214. The robotic controller 214 then generates command signals 218 that direct the operation of robotic positioner 29, which may be implemented as a CIMROC 4000 Robot Controller manufactured by CIMCORP Precision Systems, Inc., Shoreview, Minn. The robotic controller 214 typically is included as part of a robotic system by vendors of commercial robotic positioners. The purpose of robotic positioner 29 is to scan the surface 23 of structure 22 with optical energy provided by optical energy source 14 and particle stream 31 in a predetermined path at a scan speed dependent on the optical character of the surface 23 of structure 22 as determined by photodetector circuit 116. The scan speed is controlled so that substrate 28 of structure 22 does not absorb excessive optical energy resulting in an undesirable substrate temperature rise.

The temperature gradient through structure 22 is controlled to prevent damaging substrate 28 while layers 24 and 26 are being removed to expose substrate 28. Such control is effected by determining an appropriate scan speed, standoff distance, and mass flow rate and temperature of particle stream 31. However, as stated above, the preferred method of controlling the temperatures to which substrate 28 is subjected, is to vary the standoff distance and scan speed before attempting to vary the mass flow rate and temperature of the particle stream 31. The discussion, which follows describes one way by which appropriate values for the scan speed and standoff distance may be determined.

Figure 10:
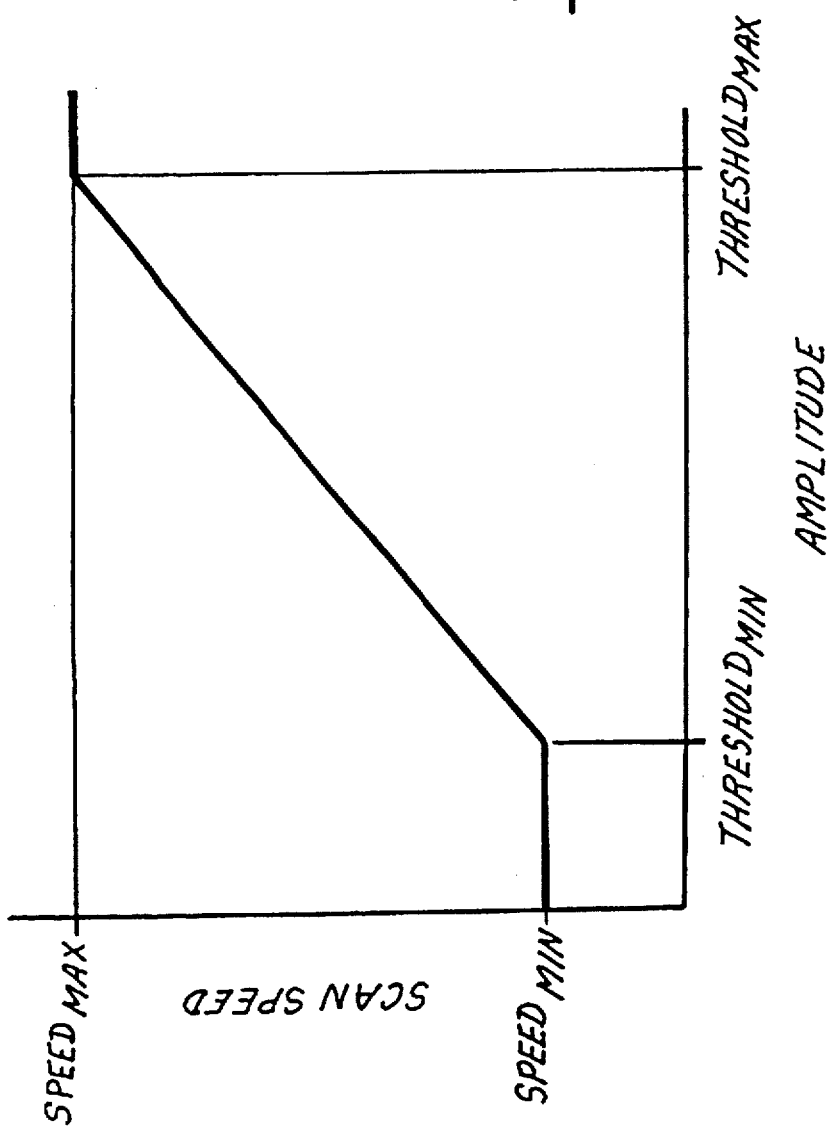
FIG. 10 is a graph showing the functional relation between the scan speed and the output of the photodetecting circuit.

As set forth above, the speed of robotic positioner 29 in relation to the weighted sum average value (WSAV) determined by processor 242, and as represented by signal 228, may be an increasing function that may be, by way of example only, linear with a positive slope between minimum and maximum speeds, as shown in FIG. 10. If the value of WSAV is equal to or less than a minimum threshold value, $Threshold_{min}$, then the speed of robotic positioner 29 is controlled to be a minimum scan speed, Scan $Speed_{min}$. If the value of WSAV is equal to or greater than a maximum threshold value, $Threshold_{max}$, then the speed of robotic positioner 29 is controlled to be the maximum scan speed, Scan $Speed_{max}$. If the value of WSAV is between the minimum and maximum threshold values, the scan speed is some value between the minimum and maximum scan speeds that satisfies the functional relation between scan speed and threshold value as described above.

The values for $Threshold_{min}$ and $Threshold_{max}$ are determined empirically as described below. A number of tests are conducted on test samples representative of structure 22, or on the structure 22 itself (both hereinafter referred to as the "test samples") using the system 198 described above with reference to FIGS. 7 and 8. The test samples are scanned by optical energy source 14 and particle stream 31, at a predetermined standoff distance (as for example, 4.0 cm), at different speeds to determine appropriate minimum and maximum speeds for robotic positioner 29. The values of signal 228, hence WSAV, are recorded for each test and are later used for reference. An operator then examines each of the test samples and determines which ones have acceptable finishes based on criteria described in greater detail further herein.

The minimum threshold value, $Threshold_{min}$, is determined by first identifying the test sample having the most material removed from structure 22, but still having an acceptable surface finish, as determined by appropriate acceptance criteria, such as the character of spectral reflections from the surface of the sample, as well as the intensity of such reflections. The value of the WSAV associated with that test sample is selected to be $Threshold_{min}$.

The maximum threshold value, $Threshold_{max}$ is determined by identifying the test sample having the least amount of material removed, but still having an acceptable finish. Again, this determination is based on appropriate acceptance criteria, as described above. The value of the WSAV associated with this particular test sample is selected to be $Threshold_{max}$.

The maximum scan speed, Scan $Speed_{max}$, is derived from the scan speed of robotic positioner 29 used when generating the data associated with $Threshold_{max}$. The Scan $Speed_{max}$ is established at a rate somewhat less than the actual scan speed associated with $Threshold_{max}$ in order to provide for a margin of error. For example, if the maximum observed scan rate is 2.0 cm/second and a safety factor of 10 percent is desired, the maximum scan rate would be established at 1.8 cm/second.

The higher the scan speed, the lower the amount of optical energy applied to a unit area of the structure 22. Therefore, the maximum scan speed of robotic positioner 29 is limited to assure that sufficient material is removed from the structure 22.

The minimum scan speed, Scan $Speed_{min}$, is derived from the scan speed of robotic positioner 29 used when generating the data associated with $Threshold_{min}$. The minimum scan speed preferably is established at a rate somewhat greater than the actual scan speed associated with $Threshold_{min}$ in order to provide for a margin of error. For example, if the minimum acceptable scan rate is 1.0 cm/second and a safety factor of 10 percent is desired, the minimum scan rate would be established at 1.1 cm/second. The lower the scan speed, the greater the amount of energy applied to a unit area of the structure 22, which may subject substrate 28 to higher, and potentially damaging temperatures. The minimum scan speed of robotic positioner 29 therefore is controlled to prevent damage to the substrate 28.

Figure 11A:
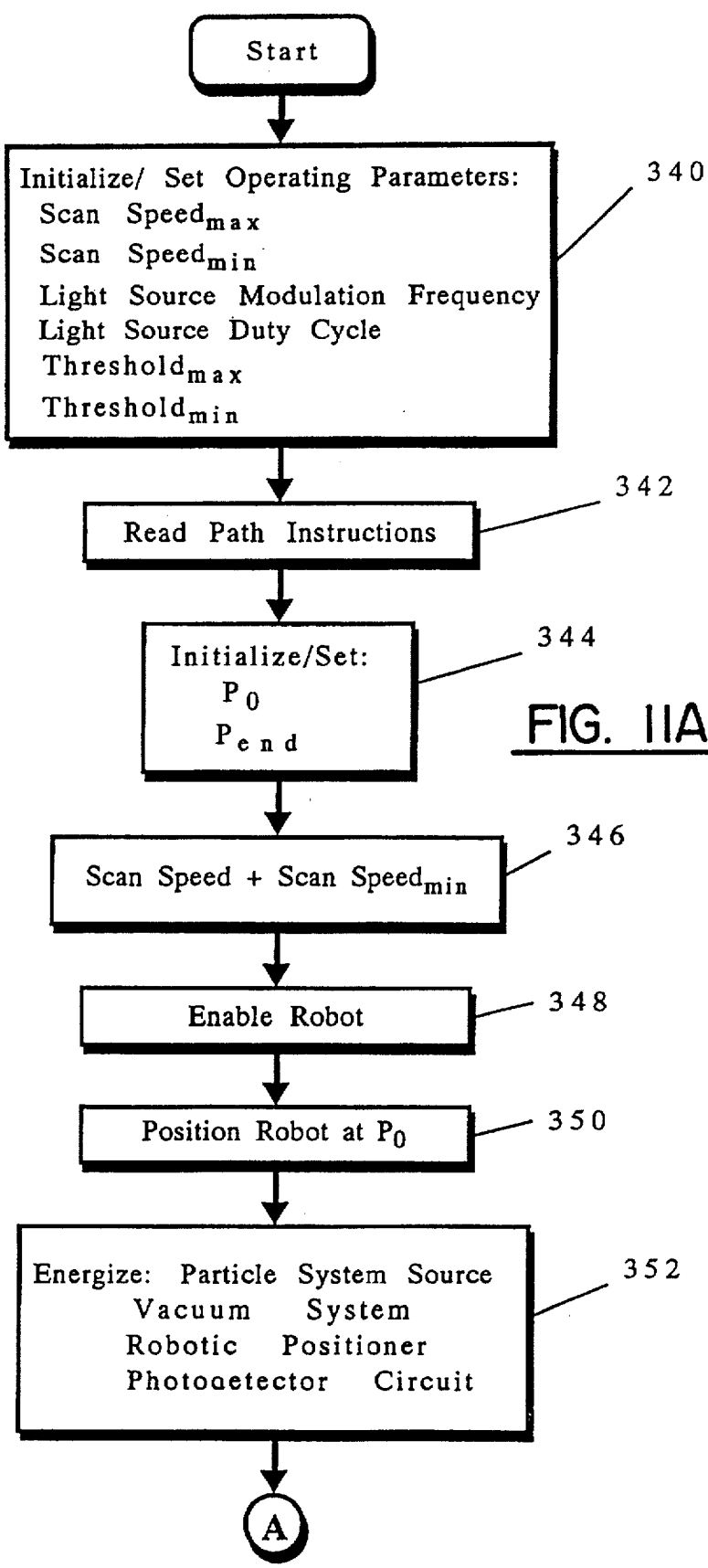
FIGS. 11A and 11B are a flow chart illustrating an example of one process by which the second embodiment may be implemented.
Figure 11B:
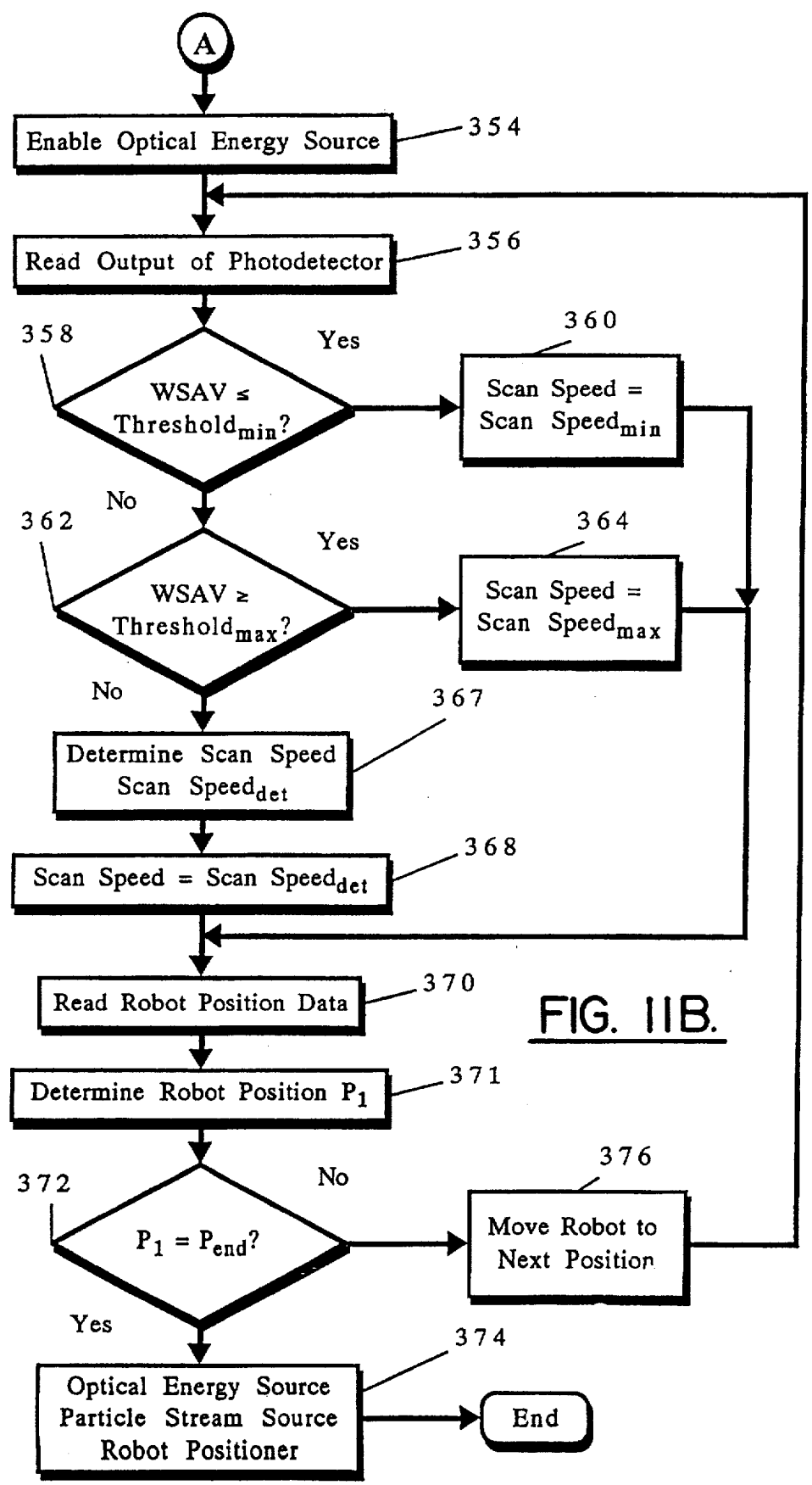

The operation of the system 198 of the second embodiment may be more fully appreciated with reference to the flowchart presented in FIGS. 11A and 11B, collectively, and the following discussion. The steps associated with such flowchart may be readily incorporated into a suitable control program used by data processor 200 and robotic controller 214, or equivalent control apparatus. The operating parameters for the minimum and maximum scan speeds of robotic positioner 29 (Scan Speed$_{min}$ and Scan Speed$_{max}$, respectively), Threshold$_{min}$, and Threshold$_{max}$, as well as the repetition rate and pulse width of the output of optical energy source 14 are initialized in data processor 200 at step 340. Path instructions are input into and read by data processor 200 at step 342 in accordance with techniques well known by those skilled in the art. The path instructions define the predetermined path of robotic positioner 29. Then, based on the path instructions, values corresponding to the initial position, P$_o$, and the end position, P$_{end}$, of robotic positioner 29 along the path are set at step 344. Next, an initial value for the scan speed of robotic positioner 29 is set equal to the minimum scan speed, Scan Speed$_{min}$ at step 346. Robotic positioner 29 is enabled at step 348 and moved to its initial position, P$_o$ at step 350. At step 352, vacuum system 37, particle stream source 204, photodetector circuit 116, and robotic positioner 29 are enabled. Optical energy source 14 is enabled at step 354. At this stage, the system is operational.

The surface characteristics of structure 22 are detected by photodetector circuit 116 as previously described, which generates output signal 310 representative of such surface characteristics. Signal 310 is converted into digital electrical signal 228, which is read by data processor 200 at step 356 and analyzed as described below.

At step 358, data processor 200 determines if the value of signal 228 (WSAV) is equal to or less than the minimum threshold value, Threshold$_{min}$. If that determination is YES, then the process proceeds to step 360 where data processor 200 defines the value for the variable scan speed, Scan Speed, to be equal to the minimum scan speed, Scan Speed$_{min}$. If the determination at step 358 is NO, then data processor 200 determines at step 362 if the value of signal 228 is equal to or greater than the maximum threshold value, Threshold$_{max}$. If the determination at step 362 is YES, data processor 200 defines at step 364 the scan speed to be equal to the maximum scan speed, Scan Speed$_{max}$. If the determination at step 362 is NO, then data processor 200 determines the scan speed at step 367, as previously described herein, and then sets the variable corresponding to the scan speed equal to the determined scan speed at step 367. Next, data processor 200 provides a scan speed control output signal 212 to robotic controller 214 at step 368 which directs robotic positioner 29 to move at the appropriate scan speed.

Then, data processor 200 reads data representative of the position of robotic positioner 29 at step 370 in accordance with techniques well known by those skilled in the art, and determines the position of robotic positioner 29 at step 371. Such position data may be provided by robotic controller 214 to the control data processor 200 by feedback signal line 232.

After the position of robotic positioner 29 has been determined, a decision is made at step 372 as to whether the present position, P$_1$, of robotic positioner 29 along the predetermined path is the position, P$_{end}$, at the end of the predetermined path, previously defined by the path instructions at step 342. If the determination at step 372 is YES, then the processing of structure 22 is complete. Then, at step 374, data processor 200 provides appropriate output signals to disable particle stream source 204, robotic controller 214 and robotic positioner 29, vacuum system 37, and optical energy source 14. However, if the determination at step 372 is NO, then structure 22 has not been completely processed. In such case, the process returns to step 356 by step 376 and continues as described above.

Third Embodiment

Figure 12:
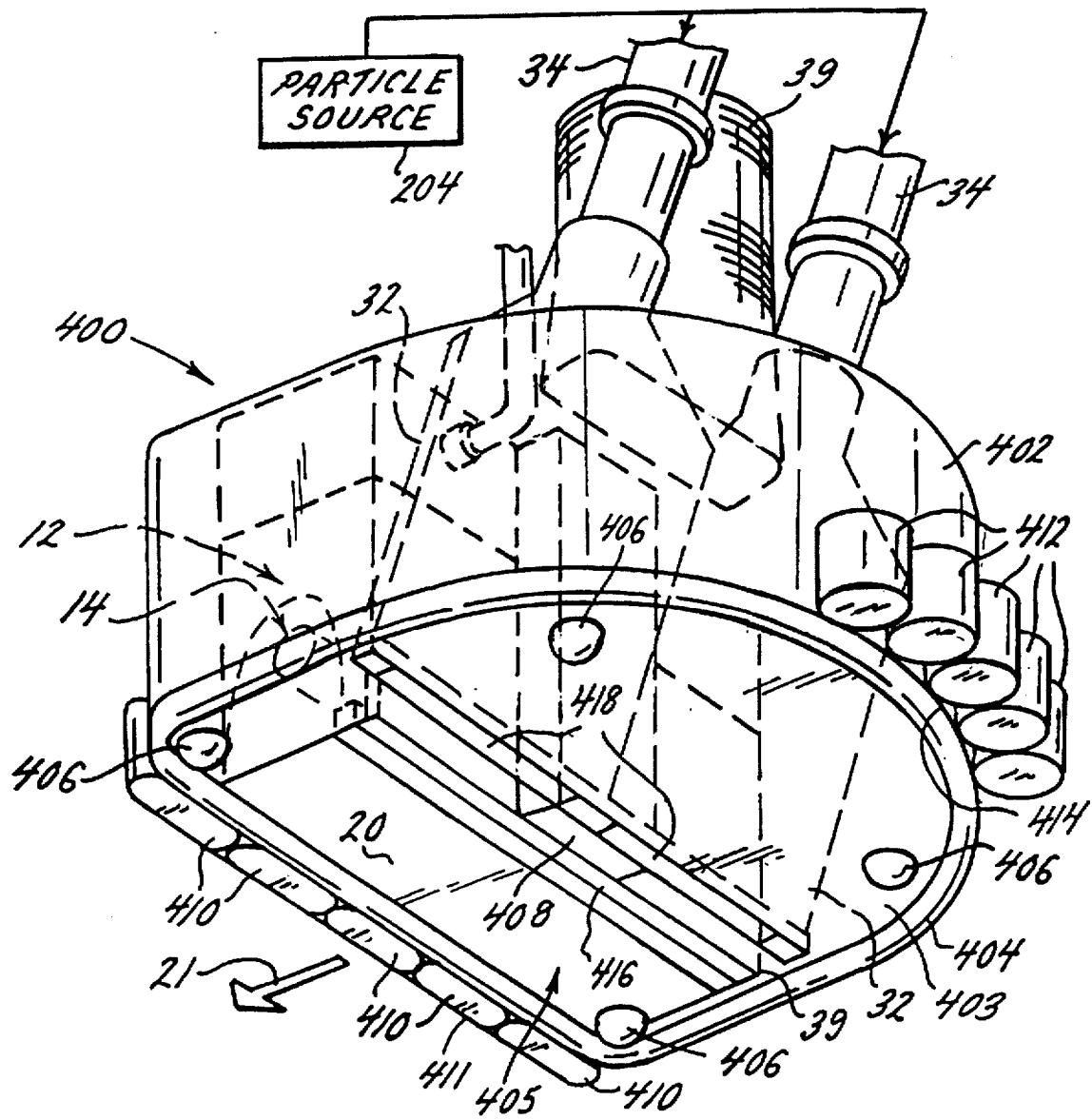
FIG. 12 is a schematic diagram of a third embodiment of a system embodying various features of the present invention.

A third embodiment of this invention is illustrated in FIG. 12. FIG. 12 shows a system 400, which comprises a housing 12, radiant energy source 14, preferably in the form of a flashlamp, a particle stream source 204, and a vacuum collection system 37, all as described above with respect to the first and second embodiments. However, as shown in FIG. 12, in the third embodiment, the housing 12 is preferably mounted in an enclosure 402. The lower edge 403 of the enclosure 402 has a seal 404 so that when the enclosure 402 is positioned over the surface 23 of a structure 22, the enclosure 402 encloses a volume 405 above the surface 23 of the structure 22. There are rollers 406 mounted on the enclosure 402 to facilitate rolling the enclosure 402 over the surface 23 of the structure 22. The volume 405 facilitates the capture of material removed from the structure 22 as well as the spent particles from particle stream 31. Furthermore, the enclosure 402 helps reduce the escape of energy from the radiant energy source 14 to surrounding areas of the structure 22.

Figure 13:
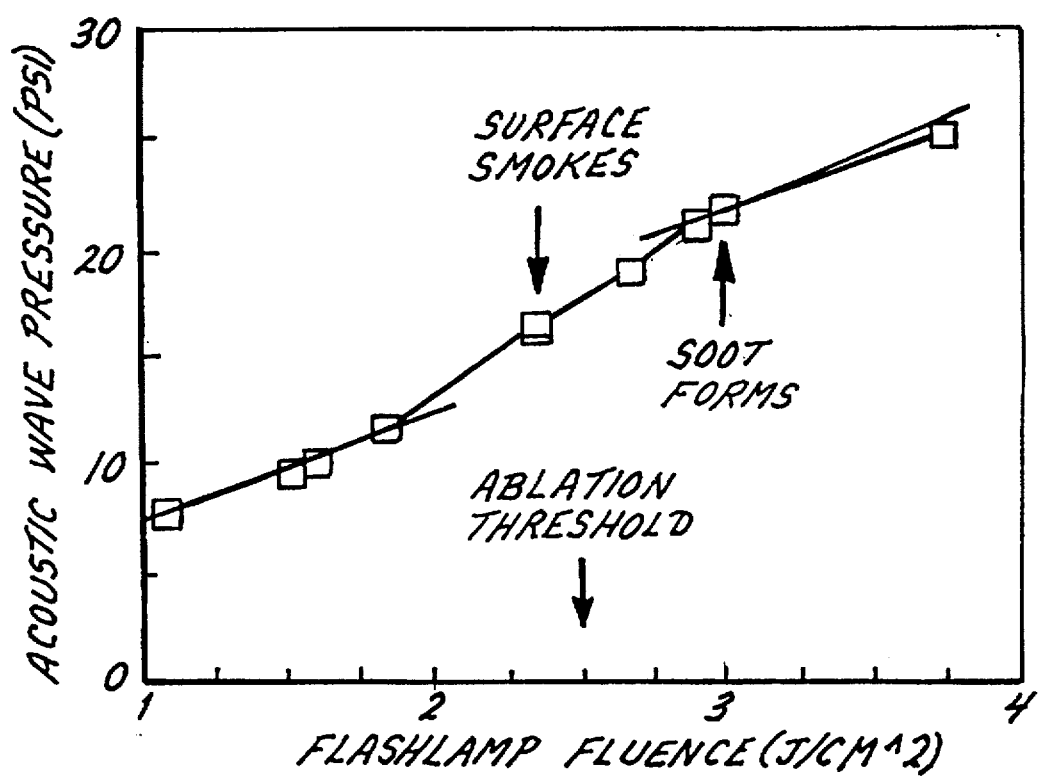
FIG. 13 is a graph of acoustic energy generated in the vicinity of the application of radiant energy, versus flashlamp fluency for a 464 μsec FWHM flashlamp pulse.

The system 400 may be provided with various sensors for facilitating the control of the system 400. For example, an acoustic sensor 408 can be provided inside the enclosure 402. The acoustic sensor 408 can monitor the acoustic wave generated by the rapid heating of the layers 24 and 26. The rapid heating of the layers 24 and 26 caused by flashlamp 14, generates an acoustic wave. This acoustic wave clearly differs to the human ear as the depth of heating penetrates between two different layers 24 and 26 of material and as the depth of the heating reaches the substrate 28. Therefore, monitoring of the acoustic wave generated while applying radiant energy to the layers 24 and 26 can provide information about the depth of heating, that is, when the depth of heating crosses a boundary between two layers 24 and 26 of material or reaches the substrate 28. Moreover, monitoring acoustic energy can also detect when the material being irradiated has reached the ablation threshold. As illustrated in FIG. 13, the acoustic wave generated increases linearly with increasing flashlamp fluence, until the ablation threshold is reached. At the ablation threshold, there is a discontinuity. The increasing magnitude of the acoustic wave with increasing fluence, and the discontinuity allow the acoustic wave to provide feedback to control the application of energy to the structure 22, for example to control the flashlamp 14 and/or the scan rate of the enclosure 402.

In particular, control means can be provided to control the scan rate of the enclosure 402 so that the flashlamp 14 provides sufficient energy to a given portion of the material to cause substantial pyrolyzation without substantial ablation, as determined by acoustic sensor 408. As the ablation threshold is reached or exceeded, as determined by acoustic sensor 408, the controller 214 increases the scan speed, but if the material is not being substantially pyrolyzed, as determined by the acoustic sensor 408, the controller 214 decreases the scan speed.

Other sensors can be provided for controlling the process. Lead sensors can be provided that can identify the substrate 28, and detect the type of coating layers 24 and 26 and their thicknesses. Specifically, a row of eddy current sensors 410 can be provided along the leading side 411 of the enclosure 402 to provide scanning capability across the width of the enclosure. These eddy current sensors may be Model No. SPO-4974 eddy current probes manufactured by the Nortec division of Stavely Company. These sensors have a one-inch diameter, and are popularly called "pencil probes". As is known in the art, the leading sensors 410 can determine the thickness of a coating, thus providing the information required to establish the flashlamp pulse duration and/or scan rate of the enclosure 402. The sensors 410 are preferably driven by, and provide feedback data to, eddy current scopes, which provide a visual display and a hard copy record, if desired. Alternatively, a microprocessor controller can process the inputs from the eddy current sensors 410 to determine the optimum scan rate for optimum coating removal rate, for example by using the data from the sensors 410 to look up the appropriate scan speed from an empirically determined table stored in RAM or ROM in a microprocessor. Such a table could be generated by experiments correlating the effectiveness of removal of a particular type of coating on a particular type of substrate, with parameters such as pulse width, pulse rate, stand off distance, and scan rate of the energy source, and the particle type, mass flow rate, and pressure of the particle stream.

Trailing sensors 412 can be provided to verify coating removal and to inspect the substrate 28 for defects. Specifically, a row of eddy current sensors 412 can be provided on the trailing side 414 of the enclosure 402. These may be the same type of sensors used for the leading sensors. As is known in the art, these trailing sensors 412 can determine the thickness of any coating remaining on the substrate 28, and determine the condition of the substrate 28. It is often desirable to strip only the upper layer 24, and leave a primer layer 26 on the substrate 28. The trailing sensors 412 can also determine the structural integrity both on bare metal substrates, and on substrates on which a primer layer 26 remains. Data pertaining to the structural integrity of the substrate 28 can be compiled and stored to provide a map of the substrate 28 for reference during future servicing. For example the data can be used to pinpoint portions of the substrate 28 that need repair. This simultaneous removal and inspection for defects is particularly useful for aircraft, since many times the primary purpose of decoating the aircraft is to perform inspections on the substrate 28. Output from the trailing sensors 412 can be used to control the scan rate to achieve the desired depth of material removal. If the sensors 412 determine that too much material is being removed, the controller 214 can increase the scan speed. If the sensors 412 determine that not enough material is being removed, the controller 214 can decrease the scan speed.

In addition to controlling scan speed based on the output of the sensors 408, 410 and/or 412, it should also be understood that the particle stream 31 could also be controlled, either instead of, or in addition to controlling the scan speed. For example if the sensors 408, 410 and/or 412 determine that the coating removal is less than desired, the flow rate or pressure of the particle stream 31 might be increased accordingly, while if the sensors 408, 410 and/or 412 determine that the coating removal is greater than desired, the flow rate or pressure of the particle stream 31 might be decreased. Furthermore, if the sensors determined that the temperature of the layer 24 is too high, the flow rate of the particle stream might be increased to increase the cooling. Note that the inlet 416 of the nozzle 39 is positioned between the outlets 418 of the nozzles 32 and the window 20 of the flashlamp 14 so that most of the removed pyrolyzed material does not have to pass in front of the window 20, where it can block a portion of the radiant energy from reaching the structure 22.

While the present invention has been described in terms of preferred embodiments, it is to be understood that the invention is not to be limited to the exact form of the apparatus or processes disclosed. For example, the invention has been described where the light source and nozzle, together, scan a stationary structure with the optical energy and a particle stream. However, it is to be understood that the light source and particle may be stationary while the structure is displaced. Scanning the structure with optical energy and a particle stream may be effected by displacement of the structure as a result of translation, rotation, or a combination of both. Therefore, it is to be understood that the invention may be practiced other than as specifically described without departing from the scope of the claims.

What is claimed is:

1. A system for removing material that is coating a substrate of a structure, comprising:

a housing;

a radiant energy source mounted to said housing for generating radiant energy to irradiate a target area of the structure with a quantity of energy sufficient to at least pyrolyze the material;

scanning means to scan radiant energy from said radiant energy source along the structure thereby changing the location of the target area; and particle directing means operatively connected to said scanning means for directing a cool particle stream at material pyrolyzed by said radiant energy source for removing pyrolyzed material from the substrate immediately after the material has been pyrolized and for cooling the substrate.

2. The system as defined in claim 1 wherein said radiant energy source is capable of generating pulsed electromagnetic energy.

3. The system as defined in claim 2 wherein said housing includes:

a reflector positioned to direct pulsed electromagnetic energy from said radiant energy source to the target area on the structure.

4. The system as defined in claim 3 wherein said radiant energy source is matched to said reflector to be capable of producing up to about 30 Joules/cm$^2$ of pulsed light energy in the target area on the structure.

5. The system as defined in claim 3 wherein said radiant energy source includes:

a flashlamp capable of generating pulsed light energy at a periodic repetition rate of multiple times a second.

6. The system as defined in claim 5 including:

control means for assuring pulsed light energy generated by said flashlamp irradiates the structure with an amount of radiant energy that is below that amount of radiant energy that would permanently change the modulus of elasticity, shear strength, or tensile strength of the substrate.

7. The system as defined in claim 5 wherein said scanning means include:

means for spacing said flashlamp and said particle directing means from the structure; and means for moving said flashlamp and said particle directing means along the structure at a controllable scan speed.

8. The system as defined in claim 7 wherein said scanning means further include:

means for varying the controllable scan speed for controlling the temperature of the substrate.

9. The system as defined in claim 1 wherein said scanning means include:

means for varying spacing between said radiant energy source and the structure to control the temperature of the substrate.

10. The system as defined in claim 1 further including:

means to vary mass flow rate of the cool particle stream to control the temperature of the substrate.

11. The system as defined in claim 1 wherein said radiant energy source includes:

at least one flashlamp capable of generating pulsed light energy, and wherein said housing encloses said at least one flashlamp and has:

a fused quartz window through which pulsed light energy generated by said at least one flashlamp is directed to irradiate the target area.

12. The system as defined in claim 1 wherein said radiant energy source includes:

a flashlamp capable of generating pulsed light energy, and wherein said housing further includes:

a reflector portion having:

a reflector surface positioned to form pulsed light energy from said flashlamp into a pulsed light beam for at least pyrolyzing the material; and cooling means in heat transfer communication with said flashlamp and said reflector portion to carry heat away from said flashlamp and said reflector surface.

13. The system as defined in claim 12 wherein said cooling means include:

a coolant path for directing coolant transparent to light energy about said flashlamp and then through said reflector portion.

14. The system as defined in claim 12 wherein said reflector surface has a parabolically shaped cross-section that defines a line of foci; and said flashlamp has:

a longitudinal axis that is positioned substantially coincident with said line of foci of said reflector surface.

15. The system as defined in claim 1 further including:

collecting means operatively connected to said scanning means for collecting material removed by the cool particle stream.

16. The system as defined in claim 1 further including:

a vacuum nozzle mounted in fixed relationship to said particle directing means for collecting remnants of the cool particle stream and material removed by the cool particle stream.

17. The system as defined in claim 1 wherein said particle directing means include:

means for including frozen $CO_2$ particles in the cool particle stream.

18. The system as defined in claim 1 including:

means capable of supplying a cool particle stream of dry, cool gas and frozen $CO_2$ particles to said particle directing means.

19. A system for removing material from a structure that includes a substrate covered with at least one layer of the material to be removed, said system comprising:

a source of pulsed radiant energy;

means for moving said source of pulsed radiant energy along a path on the structure at controllable rates to at least substantially pyrolyze the material of the layer in the path; and means for impinging the pyrolyzed material with frozen gas particles to remove the pyrolyzed material from the substrate, said means for impinging being connected for movement with said means for moving and being directed to impinge the pyrolyzed material with frozen gas particles quickly after the material is pyrolyzed to remove the pyrolyzed material and to cool the substrate.

20. The system according to claim 19 wherein said source of pulsed radiant energy includes:

a flashlamp.

21. The system according to claim 19 further including:

optical means for indicating material removal; and means responsive to said optical means for adjusting the motion rate of said means for moving.

22. The system according to claim 19 further including:

an enclosure for enclosing a volume about said source of pulsed radiant energy, said enclosure having:

a window that is transparent to the radiant energy.

23. The system according to claim 19 further including:

a vacuum system for collecting the material that has been removed from the substrate and spent frozen gas particles, said vacuum system being operatively connected to said means for moving.

24. The system according to claim 19 wherein said source of pulsed radiant energy include:

means to produce an area irradiated by the pulsed radiant energy on the structure, and wherein said means for impinging the pyrolyzed material with frozen gas particles include:

a nozzle positioned to direct the frozen gas particles at the pyrolized material adjacent the area on the structure irradiated by the pulsed radiant energy.

25. The system as defined in claim 19 wherein said means for impinging the pyrolyzed material with frozen gas particles include:

means to impinge the pyrolyzed material with frozen $CO_2$ particles.

26. The system as defined in claim 25 wherein said means for impinging the pyrolyzed material with frozen $CO_2$ particles include:

means to provide dry, cool gas flow about said frozen $CO_2$ particles.

27. A system for removing material from a structure that includes a substrate and at least one layer of the material on a surface of the substrate, said system including:

irradiating means for irradiating a target area of the structure with radiant energy of sufficient amount to pyrolyze material in the target area; and impinging means operatively connected to said irradiating means for impinging material pyrolyzed by said irradiating means with a cool particle stream, said impinging means being positioned to remove the pyrolyzed material from the substrate and cool the substrate to prevent overheating thereof by said irradiating means.

28. The system as defined in claim 27 further including:

collecting means operatively connected to said irradiating means in position to collect pyrolyzed material removed by said impinging means.

29. The system as defined in claim 27 further including:

robotic means operatively connected to said irradiating means for moving said irradiating means and said impinging means along a path along the structure.

30. The system as defined in claim 27 wherein said impinging means include:

means to impinge material pyrolyzed by said irradiating means with a particle stream of frozen gas particles.

31. The system as defined in claim 27 wherein said impinging means include:

means to impinge material pyrolyzed by said irradiating means with frozen gas particles, said system further including:

collecting means positioned to collect pyrolyzed material removed by said impinging means and remnants of the frozen gas particles.

32. The system as defined in claim 27 wherein said irradiating means include:

a flashlamp to produce the radiant energy in pulses.

33. The system as defined in claim 27 wherein said irradiating means include:

a flashlamp to produce the radiant energy, a substantial portion of which is ultraviolet radiant energy; and a reflector assembly positioned with respect to said flashlamp to direct radiant energy produced by said flashlamp to the target area.

34. The system as defined in claim 27 wherein said irradiating means include:

a flashlamp to produce the radiant energy;

a reflector assembly positioned with respect to said flashlamp to direct the radiant energy to the target area, said reflector assembly defining a coolant path through said reflector assembly and about said flashlamp; and means to provide coolant flow through said coolant path.

35. The system as defined in claim 27 wherein said irradiating means include:

a flashlamp to produce the radiant energy; and a reflector assembly positioned with respect to said flashlamp to direct radiant energy to the target area, said reflector assembly including:

first and second opposite ends;

a reflector positioned along said flashlamp between said first and second opposite ends; and a coolant jacket along said flashlamp extending between said first and second opposite ends, said first and second opposite ends, said reflector and said coolant jacket forming a coolant path through said reflector assembly and about said flashlamp.

36. The system as defined in claim 27 wherein said irradiating means further include:

a flashlamp to produce the radiant energy; and a reflector assembly positioned with respect to said flashlamp to direct the radiant energy produced by said flashlamp to the target area, said reflector assembly including:

first and second ends;

a coolant inlet at said first end;

a coolant outlet at said first end;

a reflector spaced along said flashlamp between said first and second ends;

a transparent coolant jacket positioned about said flashlamp positioned between said reflector and said flashlamp and extending between said first and second ends, said reflector assembly defining a coolant path from said inlet through said first end, about said flashlamp, through said second end, through said reflector and through said first end to said coolant outlet, through which coolant can be flowed; and a window positioned between said flashlamp and the target area, said impinging means being operatively positioned to cool and clean said window.

37. The system as defined in claim 27 wherein said irradiating means include:

a flashlamp to produce the radiant energy;

a reflector assembly positioned with respect to said flashlamp to direct the radiant energy to the target area, said reflector assembly including:

first and second ends;

a coolant inlet at said first end;

a coolant outlet at said first end;

a reflector positioned along said flashlamp between said first and second ends; and a coolant jacket about said flashlamp positioned between said reflector and said flashlamp and extending between said first and second ends, said reflector assembly defining a coolant path from said inlet through said first end, about said flashlamp, through said second end, through said reflector and through said first end to said coolant outlet, said system further including:

means for supplying a flow of generally non-electrically conducting coolant fluid that is relatively transparent to the radiant energy through said coolant path.

38. The system as defined in claim 27 wherein said irradiating means include:

a flashlamp to produce the radiant energy;

a reflector assembly positioned with respect to said flashlamp to direct the radiant energy to the target area, said reflector assembly including:

first and second ends;

a coolant inlet at said first end;

a coolant outlet at said first end;

a reflector positioned along said flashlamp between said first and second ends; and a coolant jacket about said flashlamp positioned between said reflector and said flashlamp and extending between said first and second ends, said reflector assembly defining a coolant path from said inlet through said first end, about said flashlamp, through said second end, through said reflector and through said first end to said coolant outlet, said system further including:

means for supplying a flow of deionized water through said coolant path.

39. The system as defined in claim 27 further including:

scanning means operatively connected to said irradiating means for transporting said irradiating means and said impinging means along the structure at a controllable rate;

optical means for indicating material removal; and means responsive to said optical means for adjusting the rate of transport of said scanning means.

40. The system as defined in claim 27 further including:

a housing containing said irradiating means, said housing having:

an open side adapted for movement along the structure through which said irradiating means irradiate the target area, and through which said impinging means direct the particle stream, said housing having a preferred direction of travel along the structure generally at a right angle to said open side thereof, said irradiating means and said impinging means being positioned so that when said housing is moving along the structure in the preferred direction, said irradiating means travel past a surface area of the structure just before said impinging means travel past the same surface area.

41. The system as defined in claim 40 wherein said impinging means include:

a nozzle positioned for directing the particle stream through said open side of said housing.

42. The system as defined in claim 41 wherein said housing further includes:

anti-friction means adapted for contact with the structure to allow said housing to be moved along the structure and to maintain spacing of said irradiating means and said nozzle from the structure.

43. The system as defined in claim 41 further including:

particle removal means having:

a vacuum inlet within said housing adjacent said open side thereof.

44. The system as defined in claim 43 wherein said housing further includes:

a sidewall about said open side, said sidewall including:
a seal positioned about said open side for sliding sealing contact with the structure to retain spent particles from the particle stream within said housing for collection by said particle removing means.

45. The system as defined in claim 40 further including:

particle removal means having:
a vacuum inlet within said housing, wherein said impinging means include:
a nozzle positioned for directing the particle stream through said open side of said housing, and wherein said irradiating means include:
a flashlamp; and
a reflector assembly associated with said flashlamp to direct radiant energy from said flashlamp to the target area, said vacuum inlet of said particle removing means being positioned between said nozzle of said impinging means and said reflector assembly.

46. The system as defined in claim 45 further including:

acoustic sensor means that include:
an acoustic sensor positioned within said housing to detect changes in sound that occur on the surface of the substrate, said acoustic sensor being positioned near said reflector assembly.

47. The system as defined in claim 40 further including:

acoustic sensor means having:
an acoustic sensor connected to said housing to detect changes in sound that occur on the surface of the substrate.

48. The system as defined in claim 27 further including:

a housing containing said irradiating means, said housing having:

a leading edge; and
trailing edge to establish a preferred direction of travel along the structure, said irradiating means and said impinging means being positioned so that when said housing is moving in the preferred direction, said irradiating means pass an area of the structure just before said impinging means pass the same area.

49. The system as defined in claim 48 further including:

at least one eddy current sensor positioned near said leading edge to sense characteristics of the at least one layer of the material on the surface of the substrate for control of said system.

50. The system as defined in claim 49 further including:

at least one eddy current sensor positioned near said trailing edge to sense removal of the at least one layer of the material from the surface of the substrate for control of said system.

51. A system for removing material that is coating a substrate of a structure, comprising:

a housing;

a radiant energy source mounted to said housing for generating radiant energy to irradiate a target area of the structure with a quantity of energy sufficient to at least pyrolyze the material;

a reflector for directing the radiant energy from said radiant energy source to the target area of the structure;

scanning means to scan radiant energy from said radiant energy source along the structure thereby changing the location of the target area;

particle directing means operatively connected to said scanning means for directing a cool particle stream at the pyrolyzed material for removing pyrolyzed material from the substrate and for cooling the substrate; and collecting means operatively connected to said scanning means for collecting material removed by the cool particle stream.

* * * * *

UNITED STATES PATENT AND TRADEMARK OFFICE
CERTIFICATE OF CORRECTION

PATENT NO. : 5,782,253
DATED : July 21, 1998
INVENTOR(S) : Michael C. Cates, et al.

It is certified that error appears in the above-indentified patent and that said Letters Patent is hereby corrected as shown below:

```
On the title page, item [56], insert the following:
4,627,197   12/1986   Klee et al.
5,044,129    9/1991   Olevitch
5,354,384   10/1994   Sneed et al.
```

Signed and Sealed this

Twenty-sixth Day of October, 1999

Attest:

Q. TODD DICKINSON

*Attesting Officer*     *Acting Commissioner of Patents and Trademarks*